(12) United States Patent
Satori et al.

(10) Patent No.: US 8,049,970 B2
(45) Date of Patent: Nov. 1, 2011

(54) ZOOM LENS SYSTEM AND ELECTRONIC IMAGE PICKUP APPARATUS USING THE SAME

(75) Inventors: Tomoyuki Satori, Kawagoe (JP); Fumikazu Kanetaka, Hachioji (JP)

(73) Assignee: Olmpus Imaging Corp., Tokyo (JP)

( * ) Notice: Subject to any disclaimer, the term of this patent is extended or adjusted under 35 U.S.C. 154(b) by 985 days.

(21) Appl. No.: 11/811,294

(22) Filed: Jun. 7, 2007

(65) Prior Publication Data
US 2008/0007646 A1    Jan. 10, 2008

(30) Foreign Application Priority Data
Jun. 8, 2006 (JP) .................................. 2006-159908

(51) Int. Cl.
G02B 15/14 (2006.01)
(52) U.S. Cl. ........................................................ 359/687
(58) Field of Classification Search .................. 359/687, 359/683, 676
See application file for complete search history.

(56) References Cited

U.S. PATENT DOCUMENTS

| | | | | |
|---|---|---|---|---|
| 5,859,729 | A * | 1/1999 | Misaka | 359/686 |
| 6,069,743 | A * | 5/2000 | Nagata et al. | 359/687 |
| 6,185,048 | B1 | 2/2001 | Ishii et al. | |
| 6,331,917 | B1 | 12/2001 | Ishii et al. | |
| 6,535,339 | B1 | 3/2003 | Miyauchi | |
| 6,646,814 | B2 * | 11/2003 | Uzawa et al. | 359/687 |
| 6,714,355 | B2 | 3/2004 | Miyauchi | |
| 6,744,571 | B2 | 6/2004 | Ishii et al. | |
| 6,822,807 | B2 * | 11/2004 | Yoneyama | 359/687 |
| 6,937,402 | B2 | 8/2005 | Miyauchi | |
| 7,319,562 | B2 * | 1/2008 | Itoh | 359/687 |
| 7,443,605 | B2 * | 10/2008 | Yoshitsugu | 359/687 |
| 7,760,441 | B2 * | 7/2010 | Ono et al. | 359/687 |
| 7,764,438 | B2 * | 7/2010 | Kamo et al. | 359/687 |
| 7,764,439 | B2 * | 7/2010 | Kamo et al. | 359/687 |
| 2006/0098301 | A1 * | 5/2006 | Miyajima | 359/686 |

FOREIGN PATENT DOCUMENTS

| | | |
|---|---|---|
| JP | 11-119100 | 4/1999 |
| JP | 2001-133687 | 5/2001 |

* cited by examiner

*Primary Examiner* — Ricky Mack
*Assistant Examiner* — Zachary Wilkes
(74) *Attorney, Agent, or Firm* — Kenyon & Kenyon LLP

(57) ABSTRACT

A zoom lens system has, in order from an object side, a first lens unit having a positive refractive power, a second lens unit having a negative refractive power, an aperture stop, a third lens unit having a positive refractive power, and a fourth lens unit having a positive refractive power; during magnification change, the first lens unit, the second lens unit, the third lens unit, the fourth lens unit and the aperture stop move; the first lens unit includes a negative lens and a positive lens in order from the object side; the second lens unit includes a negative lens and a positive lens in order from the object side; the third lens unit includes three or less lenses including one positive lens and one negative lens; and the fourth lens unit includes one positive lens.

21 Claims, 24 Drawing Sheets

ZOOM LENS SYSTEM AND ELECTRONIC IMAGE PICKUP APPARATUS USING THE SAME

CROSS REFERENCE TO RELATED APPLICATIONS

This application claims benefit under 35 U.S.C. §119 of Japanese patent application of No. 2006-159,908 filed in Japan on Jun. 8, 2006, the contents of which are incorporated herein by reference.

BACKGROUND OF THE INVENTION

1. Field of the Invention

The present invention relates to a zoom lens system and an electronic image pickup apparatus using the same.

2. Description of the Related Art

In recent years, instead of a silver halide film camera, a digital camera has been a mainstream which photographs a subject by use of a solid-state image pickup device such as a CCD image sensor or a CMOS type image sensor. Furthermore, the camera has a large number of categories in a broad range from a highly functional type for business to a compact popular type. In the present invention, the category of the compact popular type is especially noted.

A user of such a popular type of digital camera would like to readily enjoy photographing in a broad scene anywhere and anytime. Therefore, the user would like a small-sized camera, especially a digital camera of a thin type which is conveniently carried with a good storage property in clothing and bag pockets and which has a small size in a thickness direction.

On the other hand, a zoom ratio of the digital camera of a compact type has been generally about three, but there is a further demand for a camera having a zoom ratio higher than that of a conventional camera in order to broaden a photographing area.

As a compact zoom lens system having a comparatively high zoom ratio, a type is known which has, in order from an object side, a first lens unit having a positive refractive power, a second lens unit having a negative refractive power, a third lens unit having a positive refractive power and a fourth lens unit having a positive refractive power (e.g., see Japanese Patent Application Laid-Open Nos. 2001-133687 and 11-119100).

BRIEF SUMMARY OF THE INVENTION

A zoom lens system of the present invention comprises, in order from an object side, a first lens unit having a positive refractive power, a second lens unit having a negative refractive power, an aperture stop, a third lens unit having a positive refractive power and a fourth lens unit having a positive refractive power. During magnification change, the first lens unit, the second lens unit, the third lens unit, the fourth lens unit and the aperture stop move in an optical axis direction of the zoom lens system.

The first lens unit includes two lenses of a negative lens and a positive lens in order from the object side, the second lens unit includes two lenses of a negative lens and a positive lens in order from the object side, the third lens unit includes three or less lenses including one positive lens and one negative lens, and the fourth lens unit includes one positive lens.

Moreover, an electronic image pickup apparatus of the present invention comprises the above zoom lens system and an electronic image pickup device which is arranged on an image side of the zoom lens system and which converts an image formed by the zoom lens system into an electric signal.

Other features and advantages of the present invention will become apparent from the following detailed description of the embodiments when taken in conjunction with the accompanying drawings and appended claims.

BRIEF DESCRIPTION OF THE DRAWINGS

The present invention will become more fully understood from the detailed description given below and the accompanying drawings, which are given by way of illustration only and thus are not limitative of the present invention, wherein:

FIG. 1A is a sectional view of the lens system in a wide-angle end, FIG. 1B is a sectional view of the lens system in an intermediate position, and FIG. 1C is a sectional view of the lens system in a telephoto end;

FIG. 2A is a sectional view of the lens system in a wide-angle end, FIG. 2B is a sectional view of the lens system in an intermediate position, and FIG. 2C is a sectional view of the lens system in a telephoto end;

FIG. 3A is a sectional view of the lens system in a wide-angle end, FIG. 3B is a sectional view of the lens system in an intermediate position, and FIG. 3C is a sectional view of the lens system in a telephoto end;

FIG. 4A is a sectional view of the lens system in a wide-angle end, FIG. 4B is a sectional view of the lens system in an intermediate position, and FIG. 4C is a sectional view of the lens system in a telephoto end;

FIG. 5A is a sectional view of the lens system in a wide-angle end, FIG. 5B is a sectional view of the lens system in an intermediate position, and FIG. 5C is a sectional view of the lens system in a telephoto end;

FIG. 6A is a sectional view of the lens system in a wide-angle end, FIG. 6B is a sectional view of the lens system in an intermediate position, and FIG. 6C is a sectional view of the lens system in a telephoto end;

FIG. 7A is a sectional view of the lens system in a wide-angle end, FIG. 7B is a sectional view of the lens system in an intermediate position, and FIG. 7C is a sectional view of the lens system in a telephoto end;

FIG. 8A is a sectional view of the lens system in a wide-angle end, FIG. 8B is a sectional view of the lens system in an intermediate position, and FIG. 8C is a sectional view of the lens system in a telephoto end;

FIG. 9A is a sectional view of the lens system in a wide-angle end, FIG. 9B is a sectional view of the lens system in an intermediate position, and FIG. 9C is a sectional view of the lens system in a telephoto end;

FIG. 10A is an aberration diagram in the wide-angle end, FIG. 10B is an aberration diagram in the intermediate position, and FIG. 10C is an aberration diagram in the telephoto end;

FIG. 11A is an aberration diagram in the wide-angle end, FIG. 11B is an aberration diagram in the intermediate position, and FIG. 11C is an aberration diagram in the telephoto end;

FIG. 12A is an aberration diagram in the wide-angle end, FIG. 12B is an aberration diagram in the intermediate position, and FIG. 12C is an aberration diagram in the telephoto end;

FIG. 13A is an aberration diagram in the wide-angle end, FIG. 13B is an aberration diagram in the intermediate position, and FIG. 13C is an aberration diagram in the telephoto end;

FIG. 14A is an aberration diagram in the wide-angle end, FIG. 14B is an aberration diagram in the intermediate position, and FIG. 14C is an aberration diagram in the telephoto end;

FIG. 15A is an aberration diagram in the wide-angle end, FIG. 15B is an aberration diagram in the intermediate position, and FIG. 15C is an aberration diagram in the telephoto end;

FIG. 16A is an aberration diagram in the wide-angle end, FIG. 16B is an aberration diagram in the intermediate position, and FIG. 16C is an aberration diagram in the telephoto end;

FIG. 17A is an aberration diagram in the wide-angle end, FIG. 17B is an aberration diagram in the intermediate position, and FIG. 17C is an aberration diagram in the telephoto end;

FIG. 18A is an aberration diagram in the wide-angle end, FIG. 18B is an aberration diagram in the intermediate position, and FIG. 18C is an aberration diagram in the telephoto end;

DETAILED DESCRIPTION OF THE EMBODIMENTS

Figure 1A:
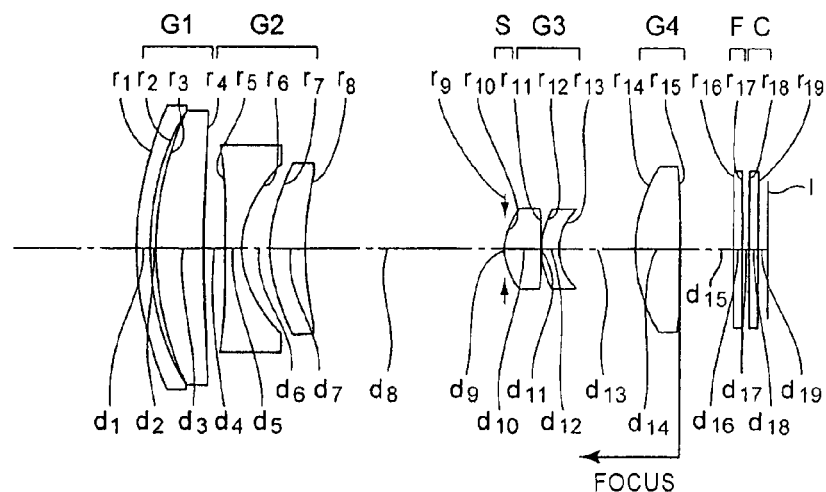
FIGS. 1A to 1C are sectional views of Example 1 of a zoom lens system of the present invention when focused on an infinite object.

As described above, a zoom lens system of the present invention has, in order from an object side, a first lens unit having a positive refractive power, a second lens unit having a negative refractive power, an aperture stop, a third lens unit having a positive refractive power and a fourth lens unit having a positive refractive power. Moreover, during magnification change, the first lens unit, the second lens unit, the third lens unit, the fourth lens unit and the aperture stop move in an optical axis direction of the zoom lens system. The first lens unit includes two lenses of a negative lens and a positive lens in order from the object side, the second lens unit includes two lenses of a negative lens and a positive lens in order from the object side, the third lens unit includes three or less lenses including one positive lens and one negative lens, and the fourth lens unit includes one positive lens.

The zoom lens system having, in order from the object side, the first lens unit having the positive refractive power, the second lens unit having the negative refractive power, the aperture stop, the third lens unit having the positive refractive power and the fourth lens unit having the positive refractive power as described above is advantageous in achieving a high zoom ratio of for example, about five.

To miniaturize a lens barrel of the zoom lens system having such a refractive power layout, first a thickness of the lens barrel when collapsed in a depth direction needs to be reduced. Therefore, in consideration of an optical performance, the zoom lens system has to be constituted of the minimum number of lens components.

For this purpose, the first lens unit includes two lenses of the negative lens and the positive lens in order from the object side. The second lens unit includes two lenses of the negative lens and the positive lens in order from the object side, the third lens unit includes three or less lenses including one positive lens and one negative lens, and the fourth lens unit includes one positive lens.

Above all, each of the first and second lens units which have heretofore been large especially in a thickness direction of the lens unit includes two lenses of the positive lens and the negative lens. In consequence, aberration correction of the lens unit is compatible with miniaturization of the lens unit in the thickness direction, and a size of the lens unit in an outer diametric direction is also reduced.

A reason for the miniaturization is as follows. In the first and second lens units, a height of an off-axial ray from an optical axis increases. Therefore, when an edge of the lens is to secure a required thickness, the thickness of the lens along the optical axis easily increases.

Furthermore, when the number of the lenses of the first and second lens units increases, an entrance pupil is positioned away from the object side. Therefore, a height of the off-axial ray passing through the first and second lens units further increases, and the thickness of the lens along the optical axis increases in order to secure the thickness of the edge of the lens.

Moreover, since the number of the lenses increases, a sum of the thicknesses of the lenses along the optical axis increases. Therefore, as the number of the lenses increases, the size of this lens unit in the diametric direction and the thickness of the lens along the optical axis increase. Therefore, the lens barrel in the collapsed state cannot be structured to be sufficiently compact.

Therefore, a constitution in which each of the first and second lens units includes only two lenses largely contributes to the compact structure of the lens barrel.

Moreover, the third lens unit having a large magnification change function is configured to have at least one positive lens and one negative lens. In consequence, satisfactory aberration correction can be performed to achieve a high performance. Furthermore, since the third lens unit includes three or less lenses, the miniaturization can be achieved.

Furthermore, since the fourth lens unit includes one positive lens, the miniaturization is achieved.

It is to be noted that, in order to obtain a high zoom ratio while maintaining the performance, the magnification change function needs to be efficiently imparted to each lens unit to satisfactorily correct the aberration of the whole magnification change region. Therefore, during the magnification change, the first to fourth lens units and the aperture stop are all moved along the optical axis.

When all of the lens units are moved in this manner, the magnification change function can effectively be imparted to each lens unit. In consequence, even if the high zoom ratio is obtained, the high performance can be achieved.

Moreover, when the aperture stop is moved, a chromatic aberration of magnification and a distortion can effectively be corrected. Moreover, an entrance pupil position and/or an exit pupil position can appropriately be controlled.

That is, when the aperture stop is moved, it is possible to balance a ray height of an off-axial light flux in a wide-angle end and a ray height of an off-axial light flux in a telephoto end. Therefore, it is possible to reduce outer diameters of the first and fourth lens units with a good balance. Especially, to reduce the outer diameter of the first lens unit in the wide-angle end is effective in reducing the size of the lens unit in the thickness direction.

Moreover, fluctuations of the exit pupil position during the magnification change can be reduced. Therefore, an angle of the ray which enters a CCD image sensor, a CMOS type image sensor or the like can be kept in an appropriate range. As a result, shading of brightness can be prevented from being generated at a peripheral portion of an image. Therefore, the zoom lens system is preferably used together with an electronic image pickup device.

In consequence, it is possible to provide a zoom lens system which is small-sized, has the high performance and is preferably used together with an electronic image pickup device such as the CCD image sensor or the CMOS type image sensor. When this zoom lens system is used, the miniaturization of the camera and the high zoom ratio are simultaneously realized, and it is possible to satisfy user's demand that a photographing region be expanded using the camera having a good portability. In addition, an image quality of the photographed image is kept to be satisfactory.

In an embodiment of the present invention, various devises are additionally applied to realize further miniaturization and obtain the satisfactory optical performance. This respect will hereinafter be described in detail.

From a viewpoint of a balance between the miniaturization and the optical performance, it is preferable that the refractive power of the first lens unit is set so as to satisfy the following condition:

$$0.50 < f_1/f_t < 2.00 \tag{1},$$

in which $f_1$ is a focal length of the first lens unit, and $f_t$ is a focal length of the zoom lens system in the telephoto end.

If $f_1/f_t$ is above an upper limit of the condition (1), the power of the first lens unit is excessively reduced. Therefore, a total length of the zoom lens system increases, and it becomes difficult to miniaturize the lens barrel. If $f_1/f_t$ is below a lower limit of the condition (1), the power of the first lens unit becomes excessively strong, a spherical aberration and a coma aberration are excessively generated in the telephoto end, and it becomes difficult to secure the satisfactory optical performance.

It is to be noted that the following condition (1-1) is preferably satisfied.

$$0.70 < f_1/f_t < 1.60 \tag{1-1}$$

It is to be noted that the following condition (1-2) is further preferably satisfied. In consequence, the above-mentioned effects can efficiently be produced.

$$0.90 < f_1/f_t < 1.20 \tag{1-2}$$

The second lens unit needs to have a large negative power in order to perform the magnification change function. When the second lens unit is constituted of two lenses including the negative lens and the positive lens as described above, a large negative power is imposed on one negative lens of the second lens unit.

On the other hand, in order to secure the high optical performance in the whole magnification change region, it is important to minimize the generation of the aberration of the second lens unit. Especially, it is important to minimize the aberration generated in this negative lens. That is, this negative lens has a large power, but the generation of the aberration has to be reduced.

Therefore, it is preferable that this negative lens is a double concave lens provided with a large power and that the lens is formed into such a shape as to satisfy the following condition (2):

$$0.35 < SF_{2n} < 1.00 \tag{2},$$

in which $SF_{2n}$ is defined as $SF_{2n} = (R_{2nf} + R_{2nr})/(R_{2nf} - R_{2n})$, $R_{2nf}$ is a radius of curvature of an object-side surface of the negative lens of the second lens unit, and $R_{2nr}$ is a radius of curvature of an image-side surface of the negative lens of the second lens unit.

If $SF_{2n}$ is above an upper limit of the condition (2), a curvature of the image-side surface of the negative lens of the second lens unit excessively increases. The generation of off-axial aberrations such as the distortion and a curvature of field increases especially in the wide-angle end. If $SF_{2n}$ is below a lower limit of the condition (2), the curvature of the object-side surface of the negative lens of the second lens unit excessively increases, and various off-axial aberrations are excessively generated in the wide-angle end.

It is to be noted that the following condition (2-1) is preferably satisfied.

$$0.45 < SF_{2n} < 0.85 \tag{2-1}$$

It is to be noted that the following condition (2-2) is further preferably satisfied. In consequence, the above-mentioned effects can efficiently be produced.

$$0.55 < SF_{2n} < 0.70 \tag{2-2}$$

To reduce the generation of the aberration and obtain the satisfactory optical performance, it is preferable that at least one lens surface of the negative lens of the second lens unit is an aspherical surface. Both of two lens surfaces may be aspherical surfaces. At this time, it is preferable to satisfy the following condition (3):

$$0.030 < (|ASP_{2nf}| + |ASP_{2nr}|)/f_w < 0.110 \tag{3},$$

in which $ASP_{2nf}$ is a an aspherical displacement of the object-side surface of the negative lens of the second lens unit, $ASP_{2nr}$ is an aspherical displacement of the image-side surface of the negative lens of the second lens unit, and $f_w$ is a focal length of the zoom lens system in the wide-angle end.

Here, the aspherical displacement is a distance between a reference sphere and the aspherical surface measured in a direction parallel to the optical axis at a position where a height from the optical axis is an effective diameter/2, and the reference sphere is a spherical surface which has a radius of curvature equal to that of the aspherical surface on the optical axis and which comes into contact with the aspherical surface on the optical axis. It is to be noted that, in a case where the lens surface is a spherical surface, the aspherical displacement is zeroed.

If $(|ASP_{2nf}| + |ASP_{2nr}|)/f_w$ is above an upper limit of the condition (3), the aberration correcting function of the aspherical surface of the negative lens of the second lens unit excessively strengthens. As a result, when eccentricity is generated between the surfaces of the aspherical lens owing to a manufacturing error, the optical performance easily largely deteriorates. If $(|ASP_{2nf}| + |ASP_{2nr}|)/f_w$ is below a lower limit of the condition (3), the aberration correcting function of the aspherical surface of the negative lens of the second lens unit excessively weakens and the distortion and the curvature of field in the wide-angle end are easily insufficiently corrected.

It is to be noted that the following condition (3-1) is preferably satisfied.

$$0.040 < (|ASP_{2nf}| + |ASP_{2nr}|)/f_w < 0.100 \tag{3-1}$$

It is to be noted that the following condition (3-2) is further preferably satisfied. In consequence, the above-mentioned effects can efficiently be produced.

$$0.050 < (|ASP_{2nf}| + |ASP_{2nr}|)/f_w < 0.095 \tag{3-2}$$

It is preferable that a material of the lens for use in the second lens unit satisfies the following conditions:

$$1.76 < n_{d2n} < 2.00 \tag{4};$$

$$1.84 < n_{d2p} < 2.20 \tag{5};$$

$$35.0 < Vd_{2n} < 50.0 \tag{6; and}$$

$$13.0 < Vd_{2p} < 30.0 \tag{7},$$

in which $n_{d2n}$ is a refractive index of the negative lens of the second lens unit for the d-line, $n_{d2p}$ is a refractive index of the positive lens of the second lens unit for the d-line, $Vd_{2n}$ is the Abbe number of the negative lens of the second lens unit for the d-line, and $Vd_{2p}$ is the Abbe number of the positive lens of the second lens unit for the d-line.

If $n_{d2n}$ is above an upper limit of the condition (4), productivity and availability of the material of the negative lens of the second lens unit deteriorate, and this results in cost increase. If $n_{d2n}$ is below a lower limit of the condition (4), the curvature of the lens surface has to be increased in order to impart a desired refractive power to the negative lens of the second lens unit. The distortion and the curvature of field in the wide-angle end, and the coma aberration and the like in the wide-angle end and the telephoto end are easily largely generated. The setting of the condition (5) has a similar reason.

Moreover, if $Vd_{2n}$ is above an upper limit of the condition (6), the only existing material having a small refractive index is obtained as the material of the negative lens of the second lens unit. If $Vd_{2n}$ is below a lower limit of the condition (6), color dispersion of the negative lens of the second lens unit excessively increases. Therefore, the chromatic aberration is excessively generated, and color blur is easily generated in the image.

Furthermore, if $Vd_{2n}$ is above an upper limit of the condition (7), it is difficult to sufficiently correct the chromatic aberration generated in the negative lens of the second lens unit with the positive lens of the second lens unit. If $Vd_{2p}$ is below a lower limit of the condition (7), anomalous dispersion increases, secondary spectrum is insufficiently corrected, and the color blur is easily generated in the image.

It is to be noted that the following conditions (4-1), (5-1), (6-1) and (7-1) are preferably satisfied:

$$1.78 < n_{d2n} < 1.95 \quad (4\text{-}1);$$

$$1.87 < n_{d2p} < 2.10 \quad (5\text{-}1);$$

$$37.0 < Vd_{2n} < 47.0 \quad (6\text{-}1); \text{ and}$$

$$15.0 < Vd_{2p} < 25.0 \quad (7\text{-}1).$$

It is to be noted that the following conditions (4-2), (5-2), (6-2) and (7-2) are further preferably satisfied. In consequence, the above-mentioned effects can further efficiently be produced.

$$1.80 < n_{d2n} < 1.89 \quad (4\text{-}2);$$

$$1.90 < n_{d2p} < 2.02 \quad (5\text{-}2);$$

$$40.0 < Vd_{2n} < 43.0 \quad (6\text{-}2); \text{ and}$$

$$17.0 < Vd_{2p} < 21.0 \quad (7\text{-}2).$$

As described above, in a case where the second lens unit is constituted of two lenses including the negative lens and the positive lens, it is preferable that the negative lens of the second lens unit has a double concave shape. However, when the lens unit is constituted in this manner, a negative distortion is easily generated especially in the wide-angle end.

To effectively correct the distortion generated in the second lens unit and correct other off-axial aberrations with a good balance, it is preferable that the positive lens of the first lens unit is formed into such a shape as to satisfy the following condition (8):

$$-1.80 < SF_{1p} < -0.55 \quad (8),$$

in which $SF_{1p}$ is defined as $SF_{1p} = (R_{1pf} + R_{1pr})/(R_{1pf} - R_{1pr})$, $R_{1pf}$ is a radius of curvature of the object-side surface of the positive lens of the first lens unit, and $R_{1pr}$ is a radius of curvature of the image-side surface of the positive lens of the first lens unit.

If $SF_{1p}$ is above an upper limit of the condition (8), the distortion of the wide-angle end can satisfactorily be corrected, but the coma aberration of the telephoto end is insufficiently corrected. If $SF_{1p}$ is below a lower limit of the condition (8), the negative distortion of the wide-angle end is insufficiently corrected. In any case, it becomes difficult to satisfactorily correct the aberration of the whole magnification change region with a good balance.

It is to be noted that the following condition (8-1) is preferably satisfied.

$$-1.50 < SF_{1p} < -0.70 \quad (8\text{-}1)$$

It is to be noted that the following condition (8-2) is further preferably satisfied. In consequence, the above-mentioned effects can further efficiently be produced.

$$-1.20 < SF_{1p} < -0.85 \quad (8\text{-}2)$$

It is preferable that the negative and positive lenses of the first lens unit are a cemented lens. When these lenses are formed into the cemented lens, an axial chromatic aberration of the telephoto end can especially effectively be corrected. Deterioration of the optical performance by the relative eccentricity of the lens due to an assembly error can be inhibited, and this contributes to improvement of yield and reduction of cost.

On the other hand, when the negative and positive lenses of the first lens unit are not cemented and the lenses are independently constituted of single lenses, respectively, an air lens is formed between the negative lens and the positive lens. It is possible to effectively correct the distortion and the coma aberration of the wide-angle end and the coma aberration of the telephoto end.

It is preferable that the air lens between the negative lens and the positive lens of the first lens unit satisfies the following condition (9):

$$-105.0 < SF_{1air} < 0 \quad (9),$$

in which $SF_{1air}$ is defined as $SF_{1air} = (R_{1nr} + R_{1pf})/(R_{1nr} - R_{1pf})$, $R_{1nr}$ is a radius of curvature of the image-side surface of the negative lens of the first lens unit, and $R_{1pf}$ is a radius of curvature of the object-side surface of the positive lens of the first lens unit.

If $SF_{1air}$ is above an upper limit of the condition (9), the coma aberrations of the wide-angle end and the telephoto end can satisfactorily be corrected, but the distortion of the wide-angle end is insufficiently corrected. If $SF_{1air}$ is below a lower limit of the condition (9), the distortion of the wide-angle end can satisfactorily be corrected, but the coma aberrations of the wide-angle end and the telephoto end are insufficiently corrected. The optical performance easily largely deteriorates owing to the relative eccentricity of the negative and positive lenses of the first lens unit due to the assembly error.

It is to be noted that the following condition (9-1) is preferably satisfied.

$$-75.0 < SF_{1air} < -5.0 \quad (9\text{-}1)$$

It is to be noted that the following condition (9-2) is further preferably satisfied. In consequence, the above-mentioned effects can further efficiently be produced.

$$-45.0 < SF_{1air} < -10.0 \quad (9\text{-}2)$$

The third lens unit can be constituted of two lenses including the positive lens and the negative lens in order from the object side.

When the third lens unit is constituted of the minimum number of the lenses required for correcting various aberrations and the chromatic aberration generated in the third lens unit, the lens barrel can be thinned. Furthermore, according to the above constitution, a front principal point of the third lens unit can be moved toward the object side, movement of the third lens unit during the magnification change can be reduced, and the zoom lens system can be miniaturized.

Moreover, the third lens unit may be constituted of three lenses including a positive lens, a positive lens and a negative lens in order from the object side. In this case, it is preferable to cement the second positive lens from the object side and the negative lens.

When the positive lens and the negative lens of the third lens unit are cemented, the axial chromatic aberration can more effectively be corrected. When the positive refractive power is shared by two positive lenses and the positive lens and the negative lens are cemented, it is possible to prevent the deterioration of the optical performance due to the relative eccentricity between the lenses generated in an assembling step. In consequence, the improvement of the yield and the reduction of the cost are achieved.

In a case where the third lens unit is constituted of either two lenses or three lenses, it is preferable that the positive lens of the third lens unit closest to the object side is formed into such a shape as to satisfy the following condition (10):

$$-1.00 < SF_{3p} < -0.05 \tag{10},$$

in which $SF_{3p}$ is defined as $SF_{3p} = (R_{3pf} + R_{3pr})/(R_{3pf} - R_{3pr})$, $R_{3pf}$ is a radius of curvature of the object-side surface of the positive lens of the third lens unit closest to the object side, and $R_{3pr}$ is a radius of curvature of the image-side surface of the positive lens of the third lens unit closest to the object side.

If $SF_{3p}$ is above an upper limit of the condition (10), the corrections of the coma aberration and astigmatism easily fall short, and it is difficult to obtain a satisfactory optical performance. If $SF_{3p}$ is below a lower limit of the condition (10), the aberration tends to be excessively corrected. In a case where the relative eccentricity of the lens is generated during assembling, the optical performance easily deteriorates largely.

It is to be noted that the following condition (10-1) is preferably satisfied.

$$-0.85 < SF_{3p} < -0.15 \tag{10-1}$$

It is to be noted that the following condition (10-2) is further preferably satisfied. In consequence, the above-mentioned effects can further efficiently be produced.

$$-0.70 < SF_{3p} < -0.25 \tag{10-2}$$

When the third lens unit is provided with one or more aspherical surfaces, the spherical aberration and the coma aberration can effectively be corrected. When a plurality of lenses are provided with aspherical surfaces, respectively, the optical performance tends to largely deteriorate owing to the relative eccentricity of the lens. However, when opposite surfaces of one lens are aspherical surfaces, the deterioration of the optical performance due to the relative eccentricity of the lens is reduced, and the spherical aberration and the coma aberration can satisfactorily be corrected.

It is preferable that the power of the second lens unit satisfies the following condition (11):

$$-0.50 < f_2/f_t < -0.10 \tag{11},$$

in which $f_2$ is a focal length of the second lens unit, and $f_t$ is a focal length of the zoom lens system in the telephoto end.

If $f_2/f_t$ is above an upper limit of the condition (11), the power of the second lens unit excessively weakens. Therefore, movement of the second lens unit for the magnification change increases. If $f_2/f_t$ is below a lower limit of the condition (11), a paraxial image forming magnification of the second lens unit decreases, and the movement for the magnification change increases. It is difficult to correct the aberration.

It is to be noted that the following condition (11-1) is preferably satisfied.

$$-0.40 < f_2/f_t < -0.15 \tag{11-1}$$

It is to be noted that the following condition (11-2) is further preferably satisfied. In consequence, the above-mentioned effects can efficiently be produced.

$$-0.30 < f_2/f_t < -0.20 \tag{11-2}$$

It is preferable that the power of the third lens unit satisfies the following condition (12):

$$0.20 < f_3/f_t < 0.45 \tag{12},$$

in which $f_3$ is a focal length of the third lens unit, and $f_t$ is a focal length of the zoom lens system in the telephoto end.

If $f_3/f_t$ is above an upper limit of the condition (12), the power of the third lens unit excessively weakens. Therefore, the movement of the third lens unit for the magnification change increases. If $f_3/f_t$ is below a lower limit of the condition (12), the paraxial image forming magnification of the third lens unit decreases, the movement for the magnification change increases, and it becomes difficult to correct the aberration.

It is to be noted that the following condition (12-1) is preferably satisfied.

$$0.25 < f_3/f_t < 0.40 \tag{12-1}$$

It is to be noted that the following condition (12-2) is further preferably satisfied. In consequence, the above-mentioned effects can further efficiently be produced.

$$0.30 < f_3/f_t < 0.35 \tag{12-2}$$

It is preferable that the power of the fourth lens unit satisfies the following condition (13):

$$0.35 < f_4/f_t < 0.90 \tag{13},$$

in which $f_4$ is a focal length of the fourth lens unit, and $f_t$ is a focal length of the zoom lens system in the telephoto end.

If $f_4/f_t$ is above an upper limit of the condition (13), the power of the fourth lens unit excessively weakens. Therefore, the astigmatism and the distortion of the whole magnification change region are insufficiently corrected. If $f_4/f_t$ is below a lower limit of the condition (13), the power of the fourth lens unit excessively strengthens. Therefore, the astigmatism and the distortion of the whole magnification change region are excessively corrected.

It is to be noted that the following condition (13-1) is preferably satisfied.

$$0.45 < f_4/f_t < 0.80 \tag{13-1}$$

It is to be noted that the following condition (13-2) is further preferably satisfied. In consequence, the above-mentioned effects can further efficiently be produced.

$$0.55 < f_4/f_t < 0.70 \tag{13-2}$$

It is preferable that the fourth lens unit is formed of a plastic material. The fourth lens unit has a main function to set an exit pupil at an appropriate position and make the rays efficiently impinge on an electronic image pickup device such as a CCD image sensor or a CMOS type image sensor.

In a case where such a function is performed, when a refractive power is set in a range of the above condition (13), a lens material such as plastic having a small refractive index may be used. When the plastic lens is used in the fourth lens unit, the cost is reduced, and a further inexpensive zoom lens system can be provided.

The positive lens of the fourth lens unit has the above function for appropriately setting the exit pupil position. However, when the fourth lens unit is provided with an aspherical surface, a function of correcting the aberration can positively be imparted.

The fourth lens unit is disposed at a position where an off-axial ray has a large height. Therefore, when the fourth lens unit is provided with the aspherical surface, the distortion and the curvature of field are mainly corrected effectively. At this time, it is preferable that the aspherical displacement of the aspherical surface satisfies the following condition (14):

$$0 < |ASP_{4p}/f_4| < 0.02 \tag{14},$$

in which $ASP_{4p}$ is an aspherical displacement of the aspherical surface disposed at the fourth lens unit, and $f_4$ is a focal length of the fourth lens unit.

As described later, in the zoom lens system of the present invention, it is advantageous that the fourth lens unit performs focusing. However, if $|ASP_{4p}/f_4|$ is above an upper limit of the condition (14), the aberration is excessively corrected by the aspherical surface, and an aberration fluctuation during photographing of the closest object point increases.

It is to be noted that the following condition (14-1) is preferably satisfied.

$$0<|ASP_{4p}/f_4|<0.015 \qquad (14\text{-}1)$$

It is to be noted that the following condition (14-2) is further preferably satisfied. In consequence, the above-mentioned effects can further efficiently be produced.

$$0<|ASP_{4p}/f_4|<0.008 \qquad (14\text{-}2)$$

To move the lens unit during the magnification change, it is preferable to move the first lens unit during the magnification change from the wide-angle end to the telephoto end so that the first lens unit is arranged closer to the object side in the telephoto end than in the wide-angle end. In this case, the first lens unit may move toward the only object side, or may move along a locus which is convex toward the image side. The second lens unit may move toward the only image side, or may move along a locus which is convex toward the image side. The third lens unit may move toward the only object side. The fourth lens unit may move toward the only object side or the only image side. Alternatively, the fourth lens unit may move along a locus which is convex toward the object or image side.

It is preferable that the aperture stop and a shutter unit move integrally with the third lens unit during the magnification change. In consequence, the entrance pupil can be formed close to the object side, and the exit pupil can be formed away from an image surface. The third lens unit is disposed close to a position where the off-axial ray has a small height. Therefore, the shutter unit does not have to be enlarged. A dead space during the moving of the aperture stop and the shutter unit is reduced.

To cut unnecessary light such as ghost or flare, a flare stop may be provided in addition to the aperture stop. The flare stop may be arranged at any of places on the object side of the first lens unit, between the first lens unit and the second lens unit, between the second lens unit and the third lens unit, between the third lens unit and the fourth lens unit and between the fourth lens unit and the image surface. It may be constituted that a flare ray is cut by a frame member as an element constituting the lens barrel, or a separate member may be provided. The flare stop may directly be printed applied or drawn on an optical element. A seal or the like may be bonded to the optical element with adhesive to constitute the flare stop.

The flare stop may have any aperture shape such as a circular shape, an elliptic shape, a rectangular shape, a polygonal shape or a shape surrounded with a function curve. Not only a harmful light flux but also a light flux such as coma flare in a peripheral area of an image may be cut.

Moreover, each lens surface may be provided with an anti-reflection coating to reduce ghost and flare. When a multilayered thin film is used as the anti-reflection coating, the ghost and the flare can preferably be reduced effectively. A lens surface, cover glass or the like may be provided with an infrared cut coating.

It is preferable that the fourth lens unit performs focusing. When the fourth lens unit performs the focusing, an only small load is applied to a driving motor for focusing owing to a small lens weight. Furthermore, the total length of the zoom lens system does not change during the focusing, and the driving motor can be arranged in the lens barrel. This is advantageous in miniaturizing the lens barrel.

The focusing may be performed by the first, second or third lens unit. A plurality of lens units may be moved to perform the focusing. The whole lens system may be moved to perform the focusing, or a part of the lenses may be moved to perform the focusing.

Moreover, a micro lens provided at the CCD image sensor may be shifted to reduce shading of the brightness in the peripheral area of the image. For example, design of the micro lens provided at the CCD image sensor may be changed in accordance with an incidence angle of the ray at each image height. Furthermore, decrease of the brightness in the peripheral area of the image may be corrected by image processing.

In addition, to prevent generation of ghost and flare, the surface of the lens which comes in contact with air is generally provided with an anti-reflection coating. On the other hand, at a cementing surface of a cemented lens, a refractive index of an adhesive material is sufficiently higher than that of the air. Therefore, the cementing surface originally has a reflectance which is equal to or larger than that of a single-layer coating in many cases, and the surface is hardly provided with the anti-reflection coating.

However, if the cementing surface is positively provided with the anti-reflection coating, the ghost and the flare can further be reduced, and a more satisfactory image can be obtained. Especially, in these days, a vitreous material having a high refractive index has spread. Since the material has a great effect of aberration correction, the material is frequently used in a camera optical system. However, when the highly refractive vitreous material is used as a cemented lens, reflection on the cementing surface cannot be ignored. In such a case, it is especially effective to provide the anti-reflection coating on the cementing surface.

An effective method of using the coating on the cementing surface is disclosed in Japanese Patent Application Laid-Open Nos. 2-27301, 2001-324676 and 2005-92115, U.S. Pat. No. 7,116,482 and the like. In these documents, the coating provided on the cementing surface of the cemented lens of the first lens unit of a positive-lead type zoom lens system is described. In the present invention, the cemented lens surface of the first lens unit having a positive power may be coated as disclosed in these documents. A material of the coating for use may appropriately be selected from comparatively highly refractive materials such as $Ta_2O_5$, $TiO_2$, $Nb_2O_5$, $ZrO_2$, $HfO_2$, $CeO_2$, $SnO_2$, $In_2O_3$, $ZnO$ and $Y_2O_3$ and comparatively low refractive materials such as $MgF_2$, $SiO_2$ and $Al_2O_3$ in accordance with the refractive index of the lens constituting a substrate and the refractive index of the adhesive material, and a layer thickness of the material may be set so as to satisfy phase conditions.

The cementing surface coating may be a multi-layered coating in the same manner as in the coating on the surface of the lens which comes in contact with air. When two or more layers of coating materials with appropriate thicknesses are appropriately combined, the reflectance can further be reduced, and a spectral characteristic, an angular characteristic and the like can be controlled. The lens cementing surface other than that of the first lens unit may be coated based on a similar idea.

Furthermore, after intentionally generating the distortion in the optical system, photographing an image with the image sensor and converting the image into an electric signal, the image may be processed to correct the distortion.

It is to be noted that all lens surfaces of the first lens unit are preferably spherical surfaces. Since an outer diameter of the lens of the first lens unit easily increases, an aspherical lens having a large aperture is required for arranging the aspherical surface at the first lens unit. This is disadvantageous in respect of the cost and the yield. Therefore, from viewpoints of the cost and the yield, it is preferable that the surfaces of the first lens unit are all spherical surfaces.

It is preferable that the zoom lens system satisfies the following condition (15):

$$4.0 < f_t/f_w < 10.0 \quad (15),$$

in which $f_w$ is a focal length of the zoom lens system in the wide-angle end, and $f_t$ is a focal length of the zoom lens system in the telephoto end.

If $f_t/f_w$ is above an upper limit of the condition (15), it is difficult to secure a satisfactory optical performance. If $f_t/f_w$ is below a lower limit of the condition (15), the zoom ratio is unfavorably reduced.

It is to be noted that the following condition (15-1) is preferably satisfied.

$$4.3 < f_t/f_w < 7.0 \quad (15\text{-}1)$$

It is to be noted that the following condition (15-2) is further preferably satisfied. In consequence, the above-mentioned effects can efficiently be produced.

$$4.7 < f_t/f_w < 5.0 \quad (15\text{-}2)$$

An electronic image pickup apparatus of the present invention has the above-mentioned zoom lens system and an electronic image pickup device which is arranged on the image side of the zoom lens system and which converts the image formed by the zoom lens system into the electric signal.

The above-mentioned zoom lens system is suitable for a constitution in which the exit pupil is disposed away from the image surface. Therefore, it is preferable that the system is used in the electronic image pickup apparatus including the electronic image pickup device which converts the image formed by the zoom lens system into the electric signal.

It is to be noted that the above-mentioned constitutions may arbitrarily be combined. An only upper limit value or lower limit value of each condition may be limited to a numeric range of a more restrictive condition.

Furthermore, it is possible to provide an electronic image pickup apparatus such as a digital camera including this zoom lens system and an electronic image pickup device in which the incidence angle of the light flux upon the image pickup surface needs to be close to a vertical state.

Next, specific examples of the zoom lens system of the present invention will be described.

Figure 1B:
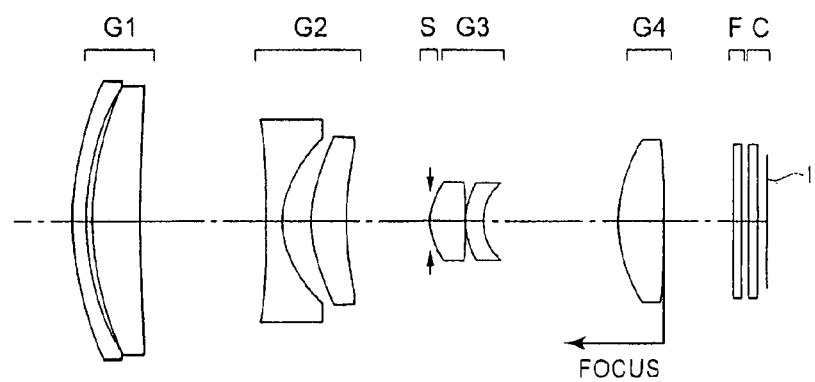
Figure 1C:
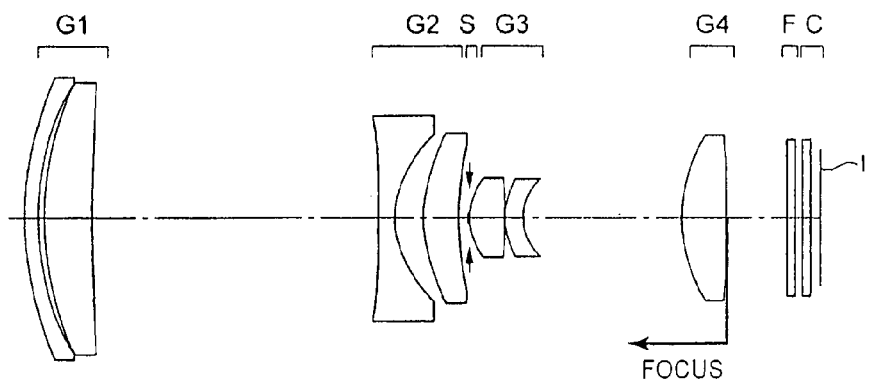
Figure 2A:
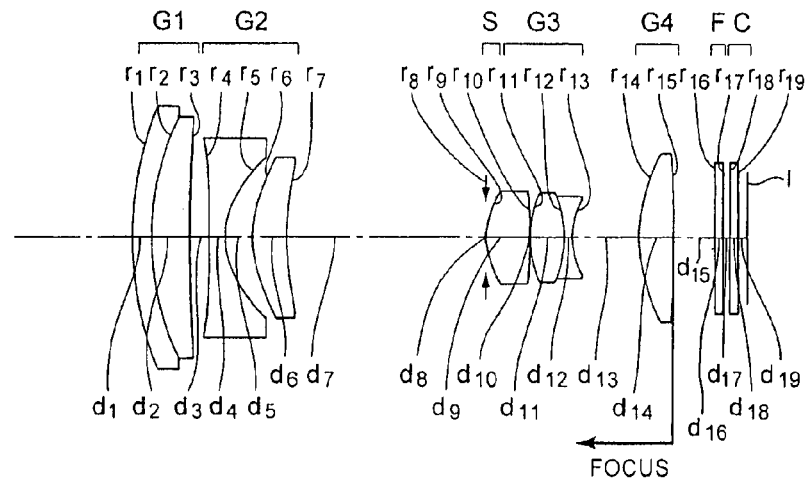
FIGS. 2A to 2C are sectional views of Example 2 of a zoom lens system of the present invention when focused on an infinite object.
Figure 2B:
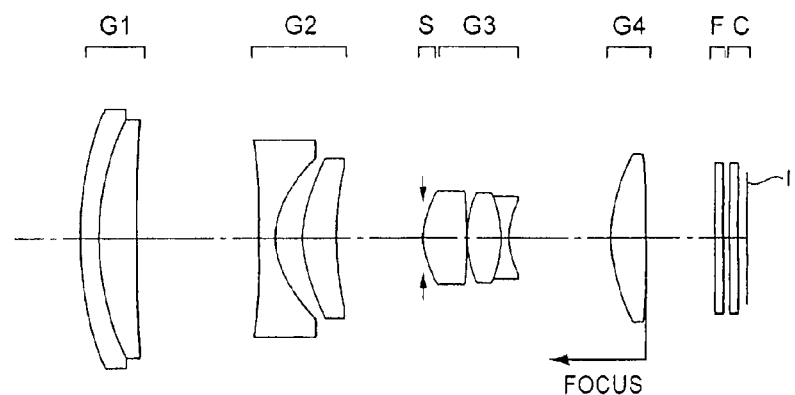
Figure 2C:
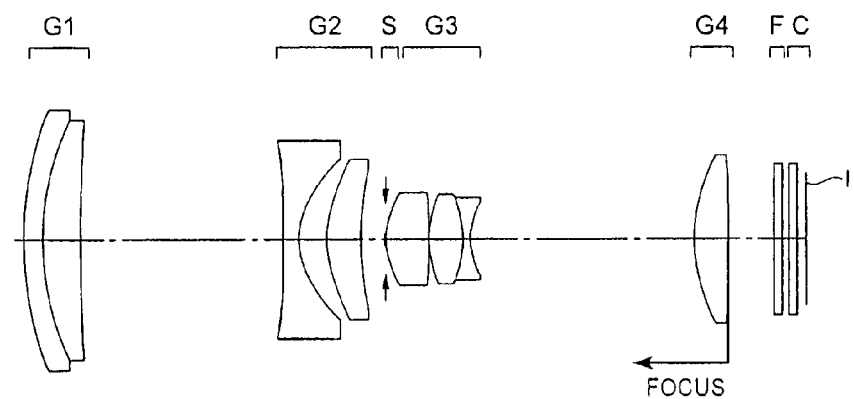
Figure 3A:
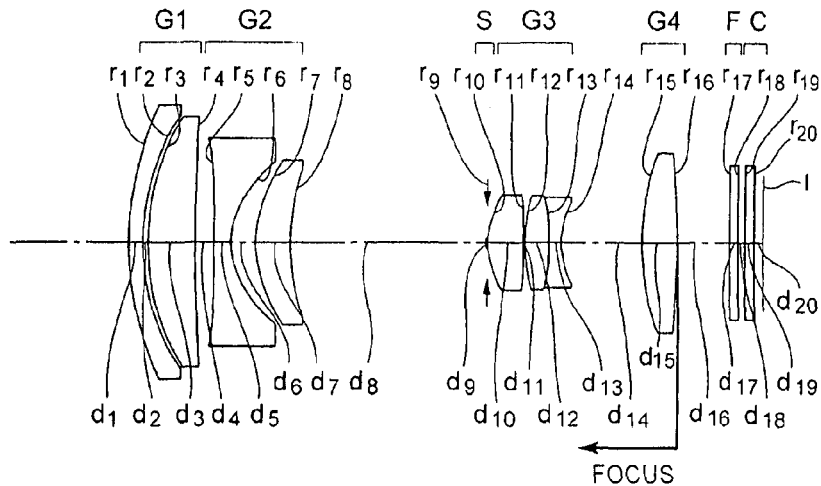
FIGS. 3A to 3C are sectional views of Example 3 of a zoom lens system of the present invention when focused on an infinite object.
Figure 3B:
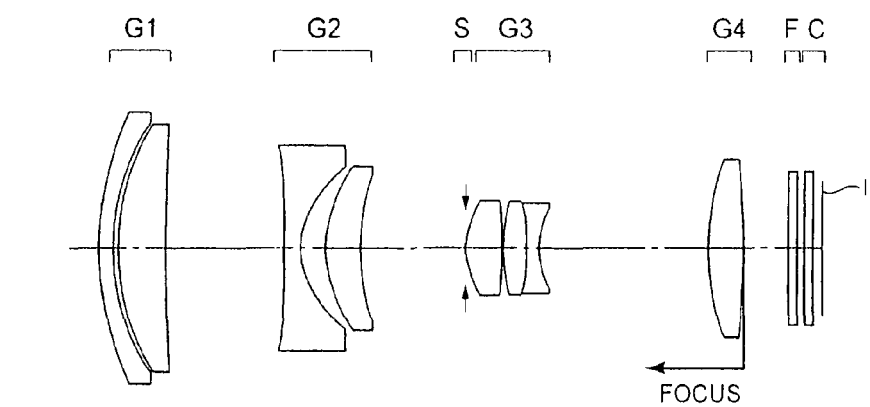
Figure 3C:
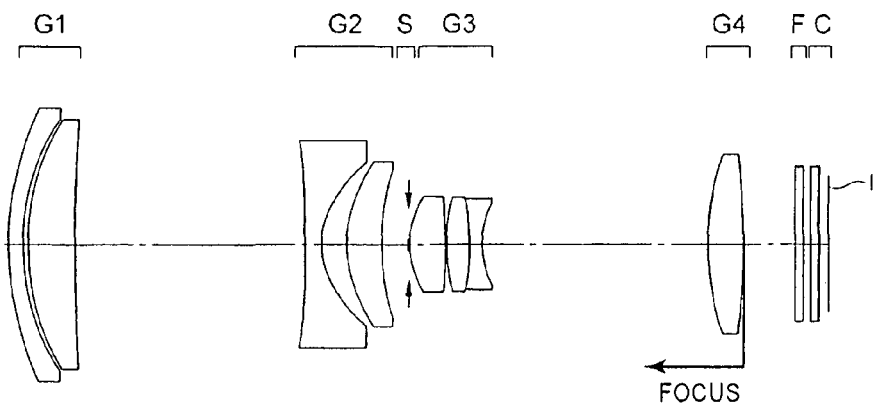

FIGS. 1A to 9C are sectional views of Examples 1 to 9 of a zoom lens system according to the present invention when focused on an infinite object, and FIGS. 1A, 2A, 3A, . . . show sectional views in a wide-angle end, FIGS. 1B, 2B, 3B, . . . show sectional views in an intermediate position, and FIGS. 1C, 2C, 3C, . . . show sectional views in a telephoto end, respectively. In these drawings, a first lens unit is denoted with G1, a second lens unit is denoted with G2, an aperture stop is denoted with S, a third lens unit is denoted with G3, a fourth lens unit is denoted with G4, a low pass filter (a parallel flat plate) provided with a wavelength band restrictive coating which restricts infrared ray is denoted with F, a cover glass (a parallel flat plate) of an electronic image pickup device is denoted with C, and an image surface is denoted with I. It is to be noted that the surface of the cover glass C is provided with a multilayered thin film for restricting a wavelength band. The cover glass C may be provided with a low pass filter function.

As shown in FIGS. 1A to 1C, Example 1 includes, in order from an object side, a first lens unit G1 having a positive refractive power, a second lens unit G2 having a negative refractive power, an aperture stop S, a third lens unit G3 having a positive refractive power and a fourth lens unit G4 having a positive refractive power.

During magnification change from a wide-angle end to a telephoto end, the first lens unit G1 moves toward the object side, the second lens unit G2 moves toward an image side, the third lens unit G3 moves toward the object side, and the fourth lens unit G4 once moves toward the object side and then reverses its movement direction to move toward the image side.

During focusing on an object disposed at a short distance, the fourth lens unit G4 moves along the optical axis.

The first lens unit G1 includes a first negative meniscus lens whose convex surface faces the object side and a second double convex positive lens in order from the object side. An air lens is formed between the first negative meniscus lens and the second double convex positive lens. The second lens unit G2 includes a third double concave negative lens and a fourth positive meniscus lens whose convex surface faces the object side in order from the object side. The third lens unit G3 includes a fifth double convex positive lens and a sixth negative meniscus lens whose convex surface faces the object side in order from the object side. The fourth lens unit G4 includes a seventh double convex positive lens.

Aspherical surfaces are used on five surfaces including opposite surfaces of the third double concave negative lens, opposite surfaces of the fifth double convex positive lens and an object-side surface of the seventh double convex positive lens.

As shown in FIGS. 2A to 2C, Example 2 includes, in order from an object side, a first lens unit G1 having a positive refractive power, a second lens unit G2 having a negative refractive power, an aperture stop S, a third lens unit G3 having a positive refractive power and a fourth lens unit G4 having a positive refractive power.

During magnification change from a wide-angle end to a telephoto end, the first lens unit G1 moves toward the object side, the second lens unit G2 once moves toward an image side and then reverses its movement direction to move toward the object side, the third lens unit G3 moves toward the object side, and the fourth lens unit G4 once moves toward the object side and then reverses its movement direction to move toward the image side.

During focusing on an object disposed at a short distance, the fourth lens unit G4 moves along the optical axis.

The first lens unit G1 includes a first negative meniscus lens whose convex surface faces the object side and a second positive meniscus lens whose convex surface faces the object side in order from the object side. The first negative meniscus lens and the second positive meniscus lens are cemented. The second lens unit G2 includes a third double concave negative lens and a fourth positive meniscus lens whose convex surface faces the object side in order from the object side. The third lens unit G3 includes a fifth double convex positive lens, a sixth double convex positive lens and a seventh double concave negative lens in order from the object side. The sixth double convex positive lens and the seventh double concave negative lens are cemented. The fourth lens unit G4 includes an eighth double convex positive lens.

Aspherical surfaces are used on five surfaces including opposite surfaces of the third double concave negative lens, opposite surfaces of the fifth double convex positive lens and an object-side surface of the eighth double convex positive lens.

As shown in FIGS. 3A to 3C, Example 3 includes, in order from an object side, a first lens unit G1 having a positive refractive power, a second lens unit G2 having a negative refractive power, an aperture stop S, a third lens unit G3 having a positive refractive power and a fourth lens unit G4 having a positive refractive power.

During magnification change from a wide-angle end to a telephoto end, the first lens unit G1 moves toward the object side, the second lens unit G2 moves toward an image side, the third lens unit G3 moves toward the object side, and the fourth lens unit G4 once moves toward the image side and then reverses its movement direction to move toward the object side.

During focusing on an object disposed at a short distance, the fourth lens unit G4 moves along the optical axis.

The first lens unit G1 includes a first negative meniscus lens whose convex surface faces the object side and a second positive meniscus lens whose convex surface faces the object side in order from the object side. The second lens unit G2 includes a third double concave negative lens and a fourth positive meniscus lens whose convex surface faces the object side in order from the object side. The third lens unit G3 includes a fifth double convex positive lens, a sixth double convex positive lens and a seventh double concave negative lens in order from the object side. The sixth double convex positive lens and the seventh double concave negative lens are cemented. The fourth lens unit G4 includes an eighth double convex positive lens.

Aspherical surfaces are used on five surfaces including opposite surfaces of the third double concave negative lens, opposite surfaces of the fifth double convex positive lens and an object-side surface of the eighth double convex positive lens.

Figure 4A:
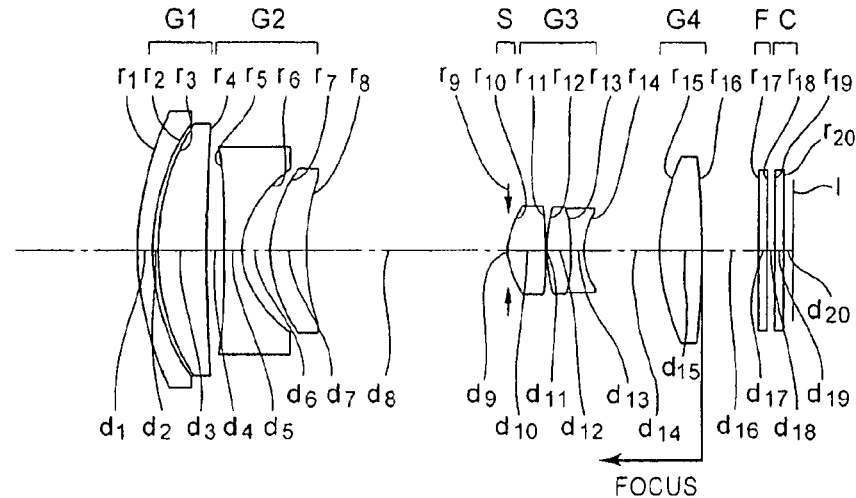
FIGS. 4A to 4C are sectional views of Example 4 of a zoom lens system of the present invention when focused on an infinite object.
Figure 4B:
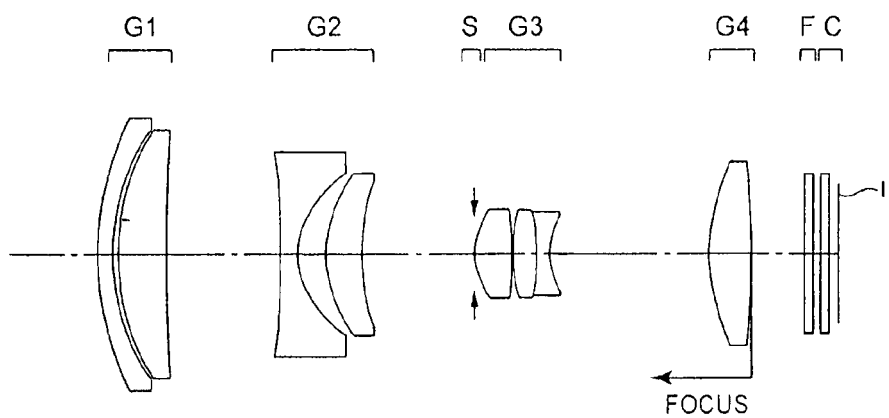
Figure 4C:
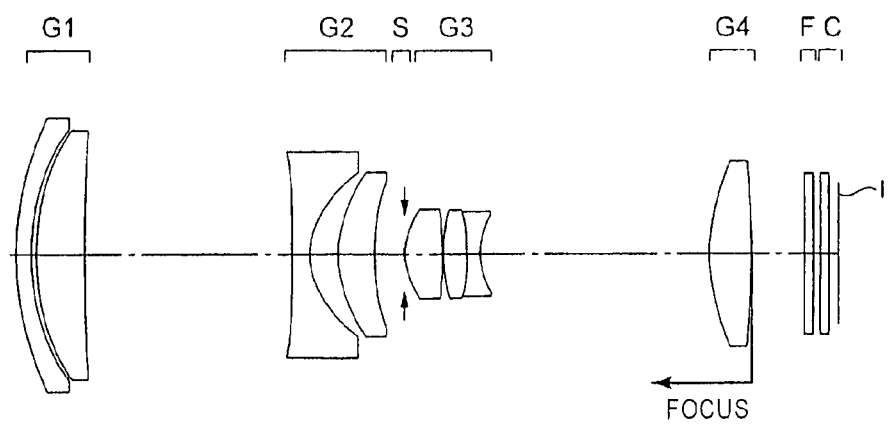

As shown in FIGS. 4A to 4C, Example 4 includes, in order from an object side, a first lens unit G1 having a positive refractive power, a second lens unit G2 having a negative refractive power, an aperture stop S, a third lens unit G3 having a positive refractive power and a fourth lens unit G4 having a positive refractive power.

During magnification change from a wide-angle end to a telephoto end, the first lens unit G1 moves toward the object side, the second lens unit G2 moves toward an image side, the third lens unit G3 moves toward the object side, and the fourth lens unit G4 once moves toward the image side and then reverses its movement direction to move toward the object side.

During focusing on an object disposed at a short distance, the fourth lens unit G4 moves along the optical axis.

The first lens unit G1 includes a first negative meniscus lens whose convex surface faces the object side and a second positive meniscus lens whose convex surface faces the object side in order from the object side. The second lens unit G2 includes a third double concave negative lens and a fourth positive meniscus lens whose convex surface faces the object side in order from the object side. The third lens unit G3 includes a fifth double convex positive lens, a sixth double convex positive lens and a seventh double concave negative lens in order from the object side. The sixth double convex positive lens and the seventh double concave negative lens are cemented. The fourth lens unit G4 includes an eighth double convex positive lens.

Aspherical surfaces are used on five surfaces including opposite surfaces of the third double concave negative lens, opposite surfaces of the fifth double convex positive lens and an object-side surface of the eighth double convex positive lens.

Figure 5A:
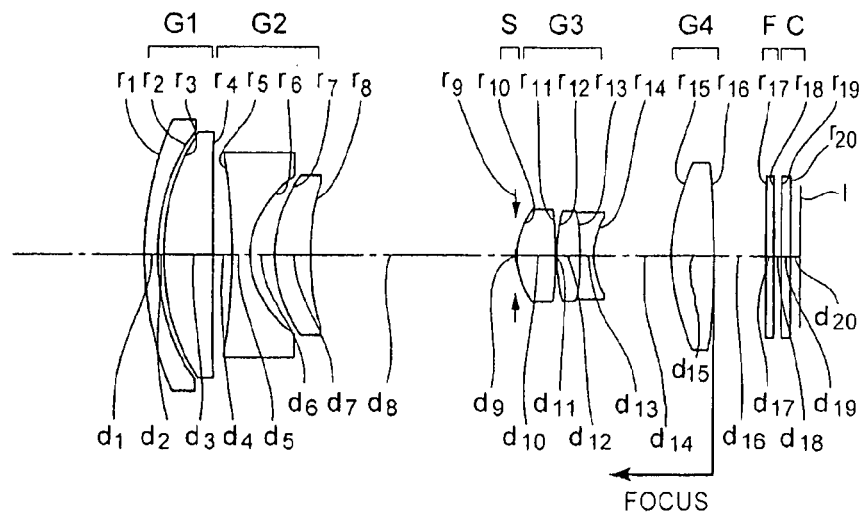
FIGS. 5A to 5C are sectional views of Example 5 of a zoom lens system of the present invention when focused on an infinite object.
Figure 5B:
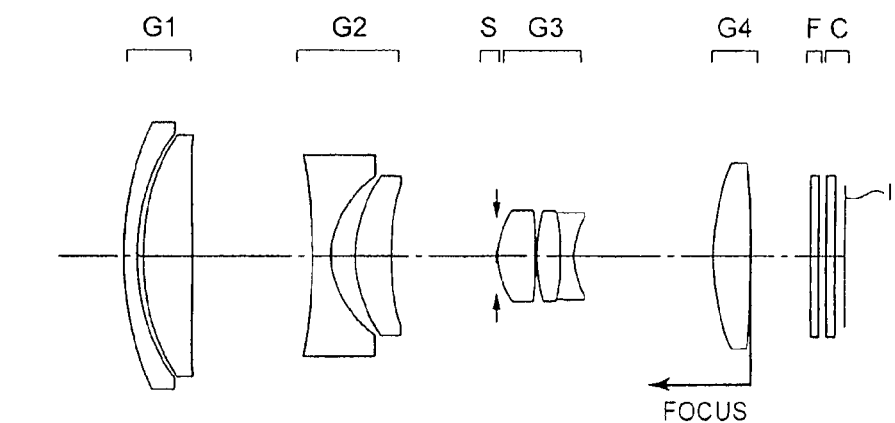
Figure 5C:
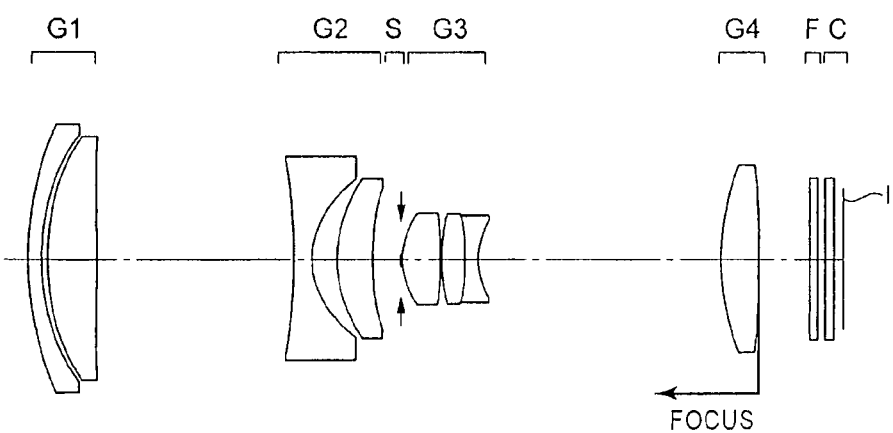

As shown in FIGS. 5A to 5C, Example 5 includes, in order from an object side, a first lens unit G1 having a positive refractive power, a second lens unit G2 having a negative refractive power, an aperture stop S, a third lens unit G3 having a positive refractive power and a fourth lens unit G4 having a positive refractive power.

During magnification change from a wide-angle end to a telephoto end, the first lens unit G1 moves toward the object side, the second lens unit G2 once moves toward an image side and then reverses its movement direction to move toward the object side, the third lens unit G3 moves toward the object side, and the fourth lens unit G4 once moves toward the object side and then reverses its movement direction to move toward the image side.

During focusing on an object disposed at a short distance, the fourth lens unit G4 moves along the optical axis.

The first lens unit G1 includes a first negative meniscus lens whose convex surface faces the object side and a second double convex positive lens in order from the object side. The second lens unit G2 includes a third double concave negative lens and a fourth positive meniscus lens whose convex surface faces the object side in order from the object side. The third lens unit G3 includes a fifth double convex positive lens, a sixth double convex positive lens and a seventh double concave negative lens in order from the object side. The sixth double convex positive lens and the seventh double concave negative lens are cemented. The fourth lens unit G4 includes an eighth double convex positive lens.

Aspherical surfaces are used on five surfaces including opposite surfaces of the third double concave negative lens, opposite surfaces of the fifth double convex positive lens and an object-side surface of the eighth double convex positive lens.

Figure 6A:
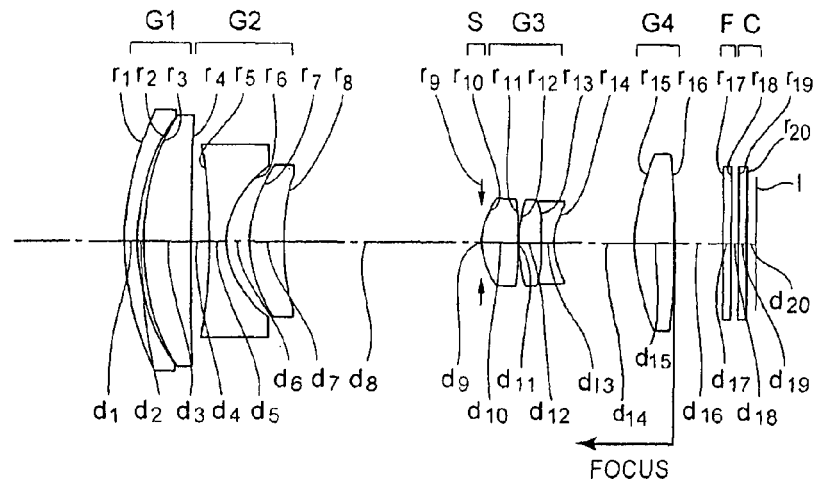
FIGS. 6A to 6C are sectional views of Example 6 of a zoom lens system of the present invention when focused on an infinite object.
Figure 6B:
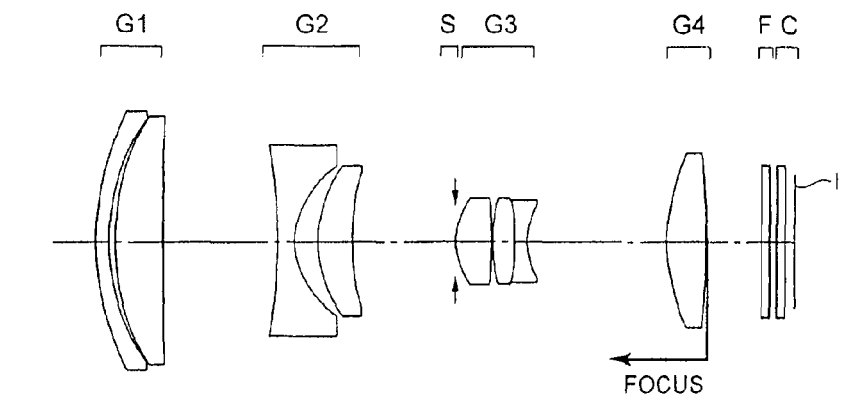
Figure 6C:
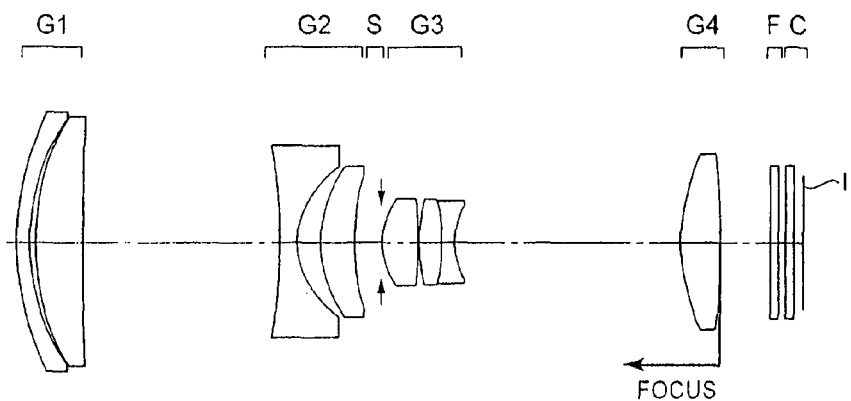

As shown in FIGS. 6A to 6C, Example 6 includes, in order from an object side, a first lens unit G1 having a positive refractive power, a second lens unit G2 having a negative refractive power, an aperture stop S, a third lens unit G3 having a positive refractive power and a fourth lens unit G4 having a positive refractive power.

During magnification change from a wide-angle end to a telephoto end, the first lens unit G1 moves toward the object side, the second lens unit G2 once moves toward an image side and then reverses its movement direction to move toward the object side, the third lens unit G3 moves toward the object side, and the fourth lens unit G4 once moves toward the object side and then reverses its movement direction to move toward the image side.

During focusing on an object disposed at a short distance, the fourth lens unit G4 moves along the optical axis.

The first lens unit G1 includes a first negative meniscus lens whose convex surface faces the object side and a second positive meniscus lens whose convex surface faces the object side in order from the object side. An air lens is formed between the first negative meniscus lens and the second positive meniscus lens. The second lens unit G2 includes a third double concave negative lens and a fourth positive meniscus lens whose convex surface faces the object side in order from the object side. The third lens unit G3 includes a fifth double convex positive lens, a sixth double convex positive lens and a seventh double concave negative lens in order from the object side. The sixth double convex positive lens and the seventh double concave negative lens are cemented. The fourth lens unit G4 includes an eighth double convex positive lens.

Aspherical surfaces are used on five surfaces including opposite surfaces of the third double concave negative lens, opposite surfaces of the fifth double convex positive lens and an object-side surface of the eighth double convex positive lens.

Figure 7A:
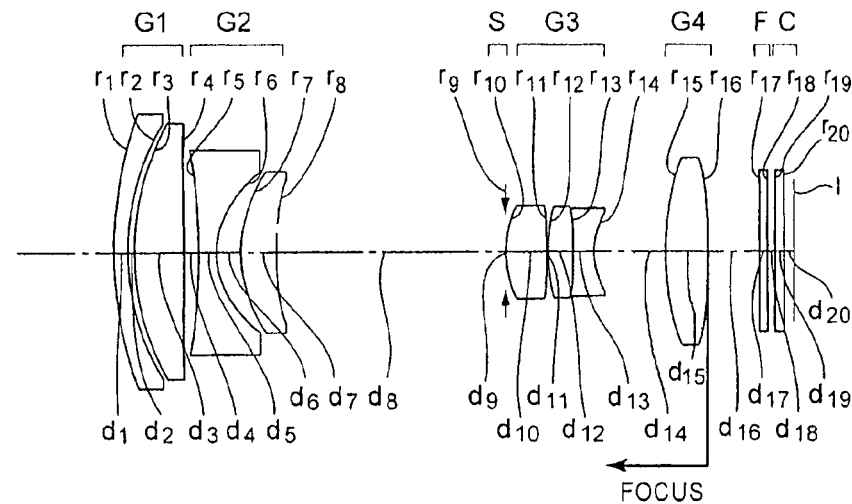
FIGS. 7A to 7C are sectional views of Example 7 of a zoom lens system of the present invention when focused on an infinite object.
Figure 7B:
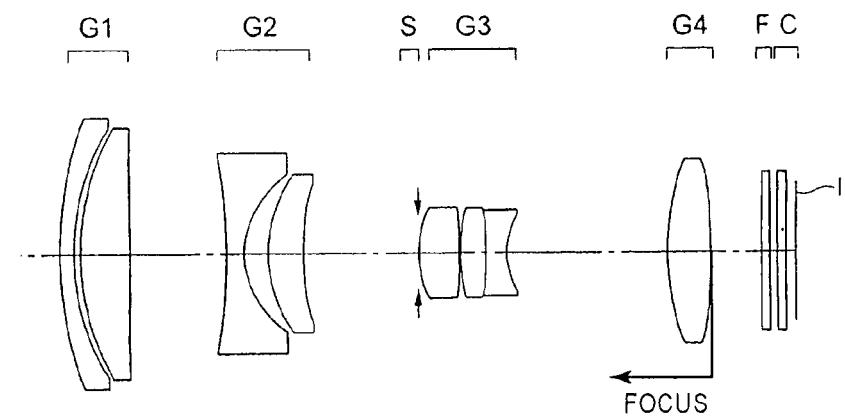
Figure 7C:
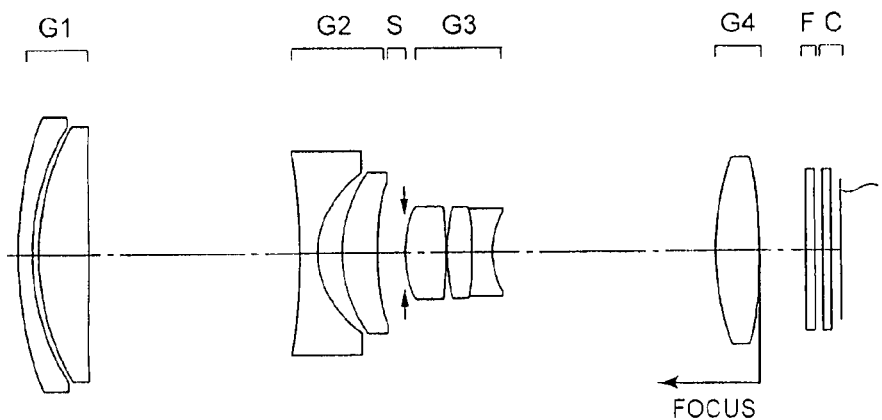

As shown in FIGS. 7A to 7C, Example 7 includes, in order from an object side, a first lens unit G1 having a positive refractive power, a second lens Unlit G2 having a negative refractive power, an aperture stop S, a third lens unit G3 having a positive refractive power and a fourth lens unit G4 having a positive refractive power.

During magnification change from a wide-angle end to a telephoto end, the first lens unit G1 moves toward the object side, the second lens unit G2 moves toward an image side, the third lens unit G3 moves toward the object side, and the fourth lens unit G4 moves toward the image side.

During focusing on an object disposed at a short distance, the fourth lens unit G4 moves along the optical axis.

The first lens unit G1 includes a first negative meniscus lens whose convex surface faces the object side and a second double convex positive lens in order from the object side. The second lens unit G2 includes a third double concave negative lens and a fourth positive meniscus lens whose convex surface faces the object side in order from the object side. The third lens unit G3 includes a fifth double convex positive lens, a sixth double convex positive lens and a seventh double concave negative lens in order from the object side. The sixth double convex positive lens and the seventh double concave negative lens are cemented. The fourth lens unit G4 includes an eighth double convex positive lens.

Aspherical surfaces are used on five surfaces including opposite surfaces of the third double concave negative lens, opposite surfaces of the fifth double convex positive lens and an object-side surface of the eighth double convex positive lens.

Figure 8A:
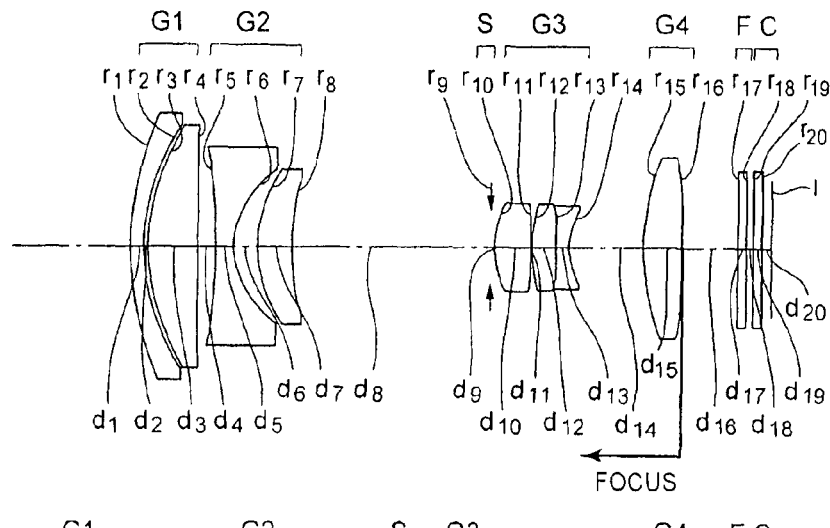
FIGS. 8A to 8C are sectional views of Example 8 of a zoom lens system of the present invention when focused on an infinite object.
Figure 8B:
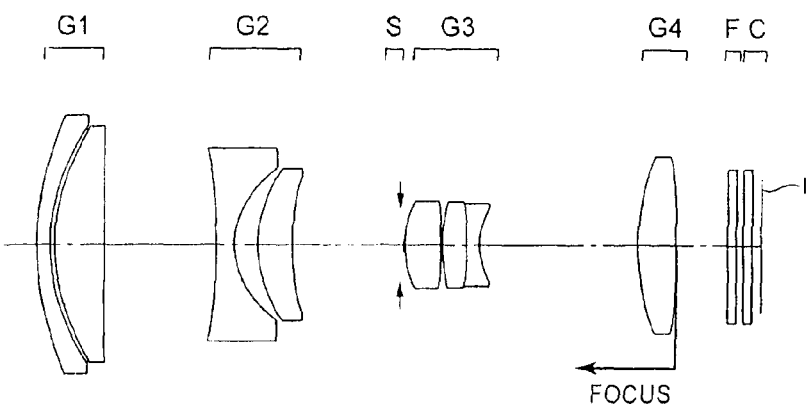
Figure 8C:
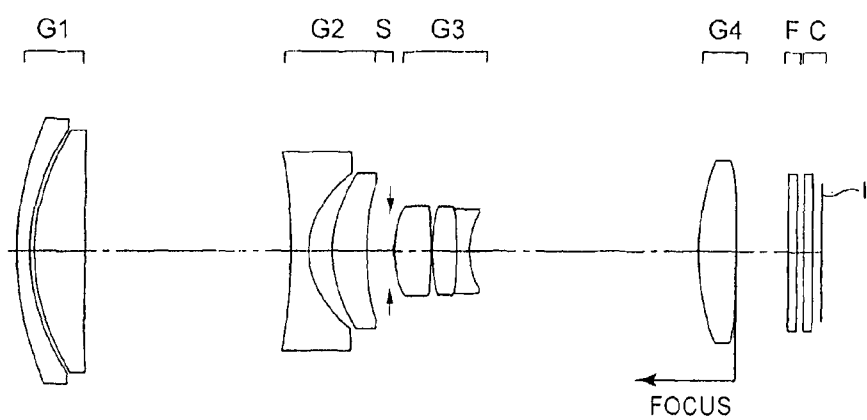

As shown in FIGS. 8A to 8C, Example 8 includes, in order from an object side, a first lens unit G1 having a positive refractive power, a second lens unit G2 having a negative refractive power, an aperture stop S, a third lens unit G3 having a positive refractive power and a fourth lens unit G4 having a positive refractive power.

During magnification change from a wide-angle end to a telephoto end, the first lens unit G1 moves toward the object side, the second lens unit G2 moves toward an image side, the third lens unit G3 moves toward the object side, and the fourth lens unit G4 once moves toward the image side and then reverses movement direction to move toward the object side.

During focusing on an object disposed at a short distance, the fourth lens unit G4 moves along the optical axis.

The first lens unit G1 includes a first negative meniscus lens whose convex surface faces the object side and a second positive meniscus lens whose convex surface faces the object side in order from the object side. The second lens unit G2 includes a third double concave negative lens and a fourth positive meniscus lens whose convex surface faces the object side in order from the object side. The third lens unit G3 includes a fifth double convex positive lens, a sixth double convex positive lens and a seventh double concave negative lens in order from the object side. The sixth double convex positive lens and the seventh double concave negative lens are cemented. The fourth lens unit G4 includes an eighth double convex positive lens.

Aspherical surfaces are used on five surfaces including opposite surfaces of the third double concave negative lens, opposite surfaces of the fifth double convex positive lens and an object-side surface of the eighth double convex positive lens.

Figure 9A:
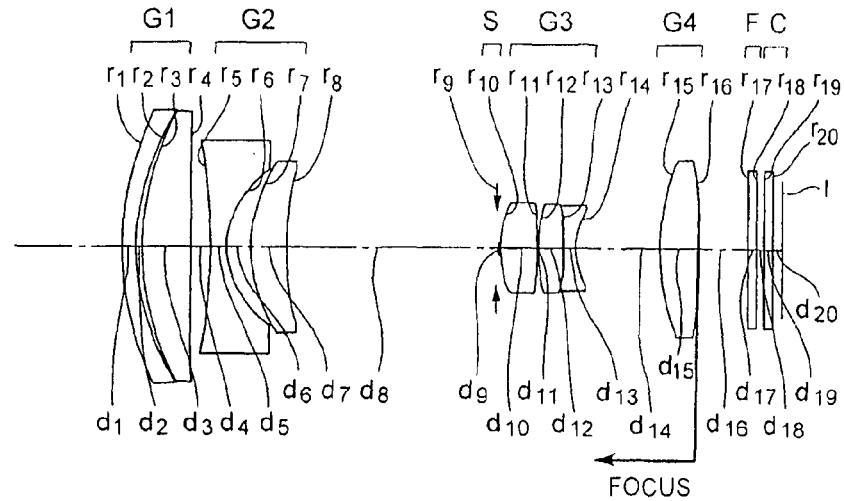
FIGS. 9A to 9C are sectional views of Example 9 of a zoom lens system of the present invention when focused on an infinite object.
Figure 9B:
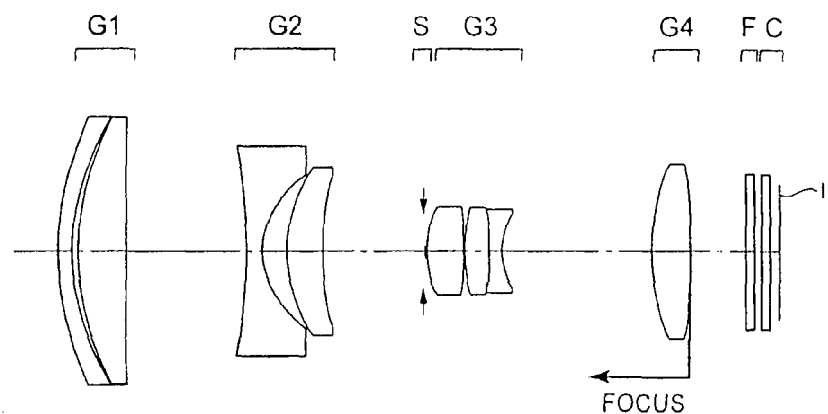
Figure 9C:
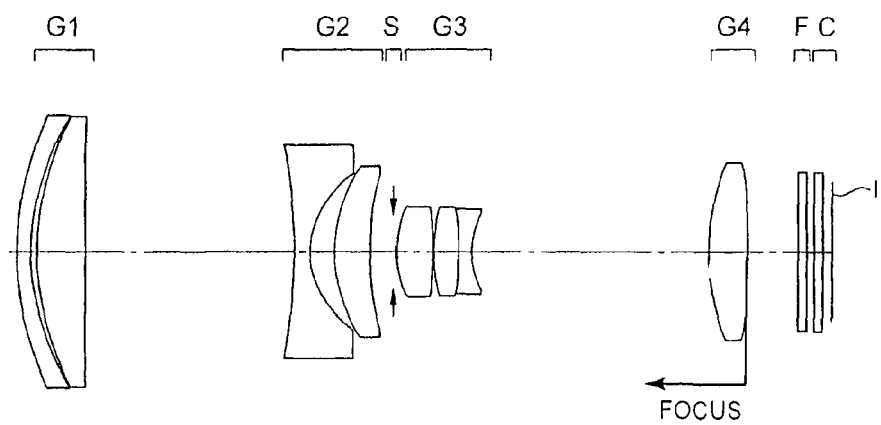
Figure 10A:
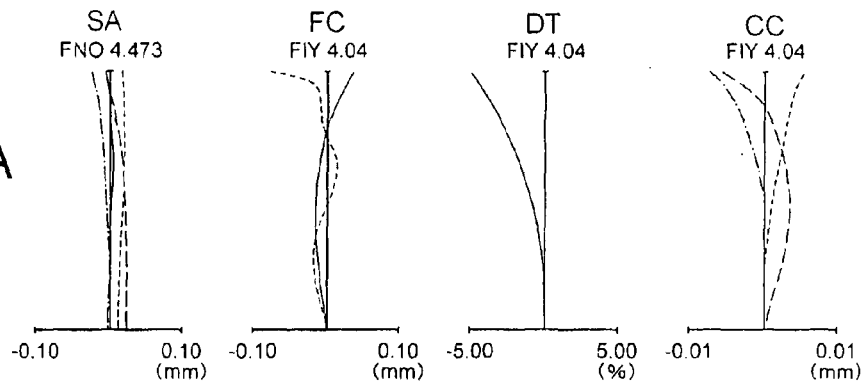
FIGS. 10A to 10C are aberration diagrams of Example 1 when focused on the infinite object.
Figure 10B:
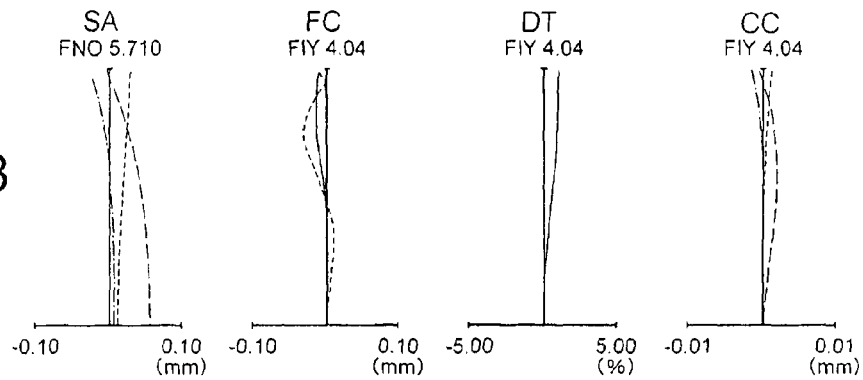
Figure 10C:
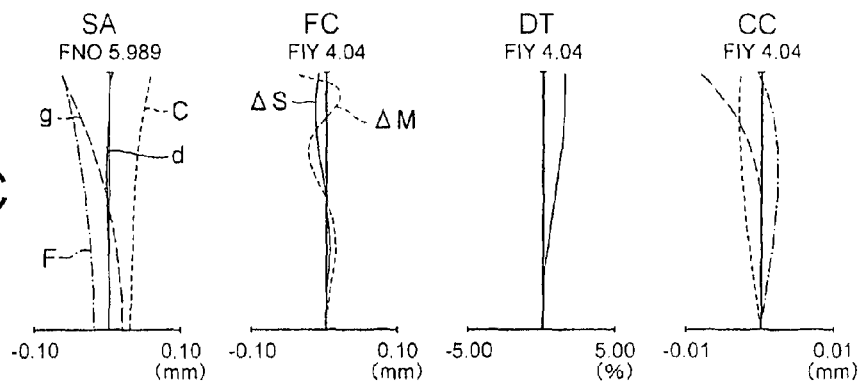
Figure 11A:
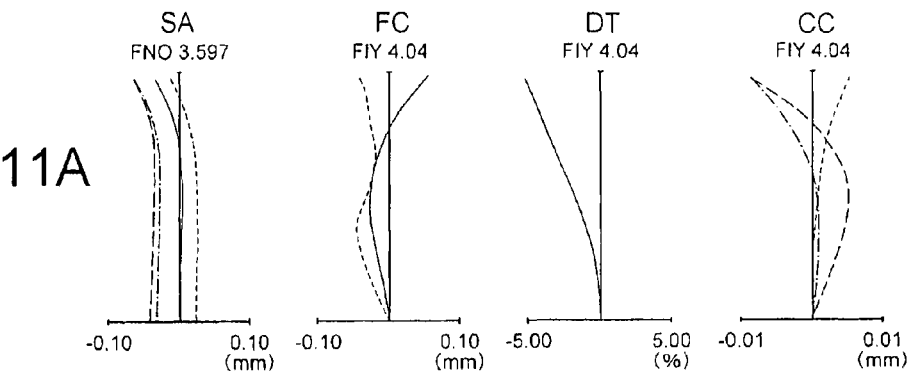
FIGS. 11A to 11C are aberration diagrams of Example 2 when focused on the infinite object.
Figure 11B:
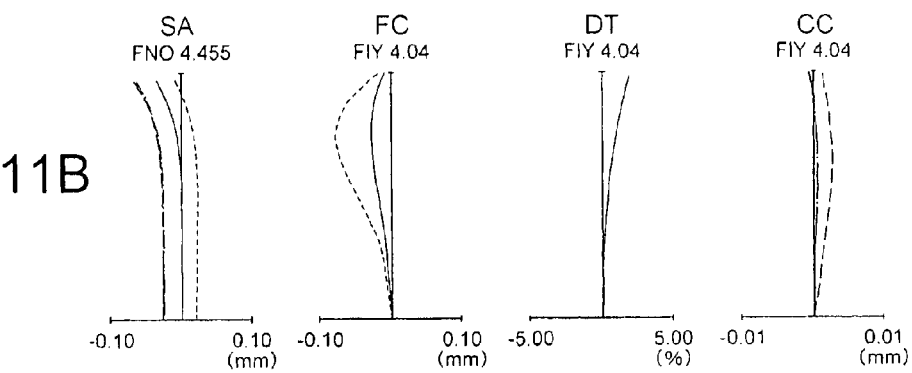
Figure 11C:
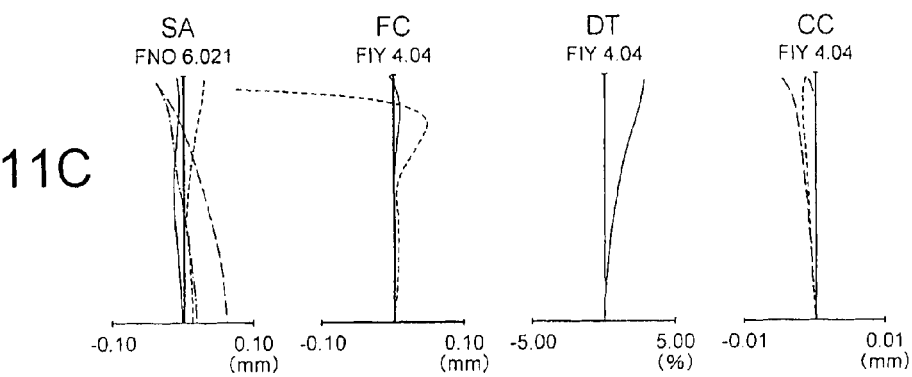
Figure 12A:
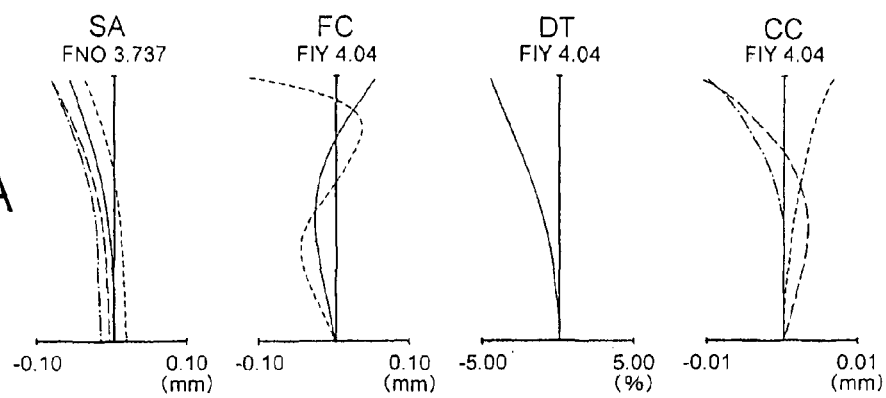
FIGS. 12A to 12C are aberration diagrams of Example 3 when focused on the infinite object.
Figure 12B:
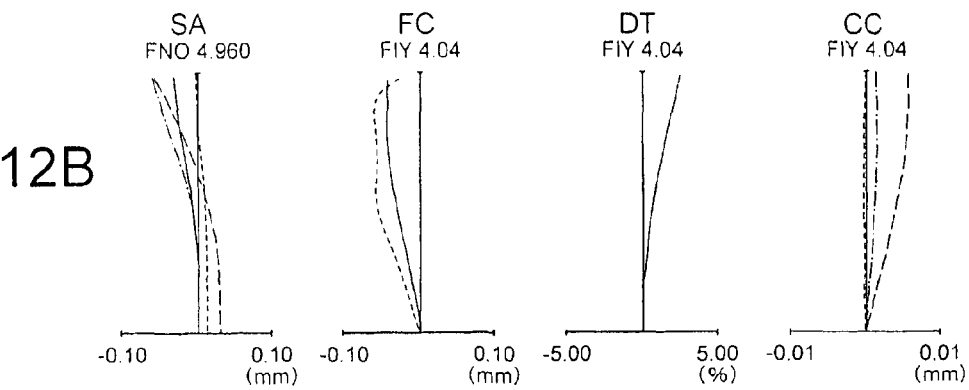
Figure 12C:
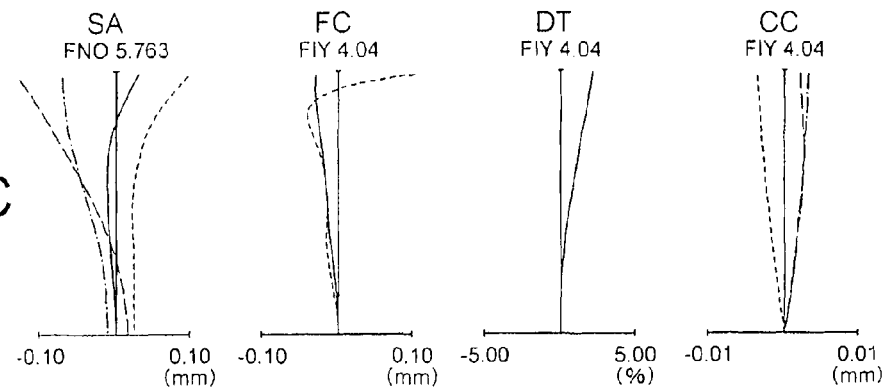
Figure 13A:
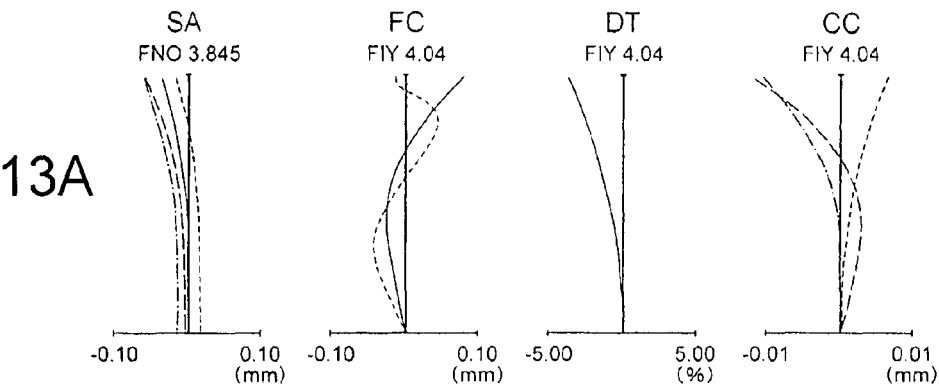
FIGS. 13A to 13C are aberration diagrams of Example 4 when focused on the infinite object.
Figure 13B:
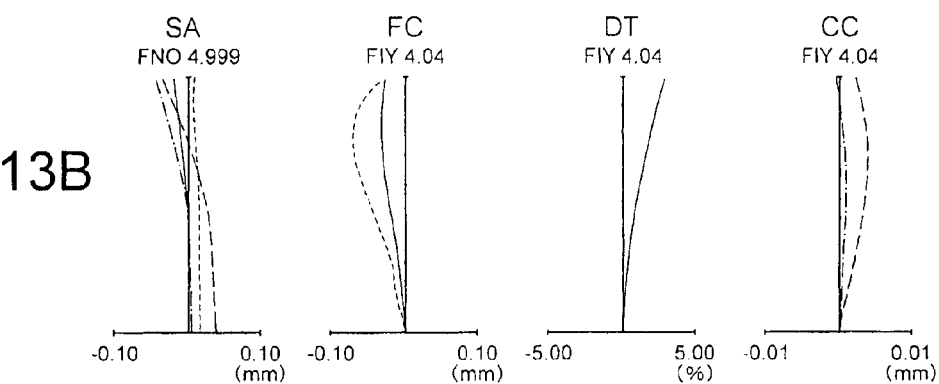
Figure 13C:
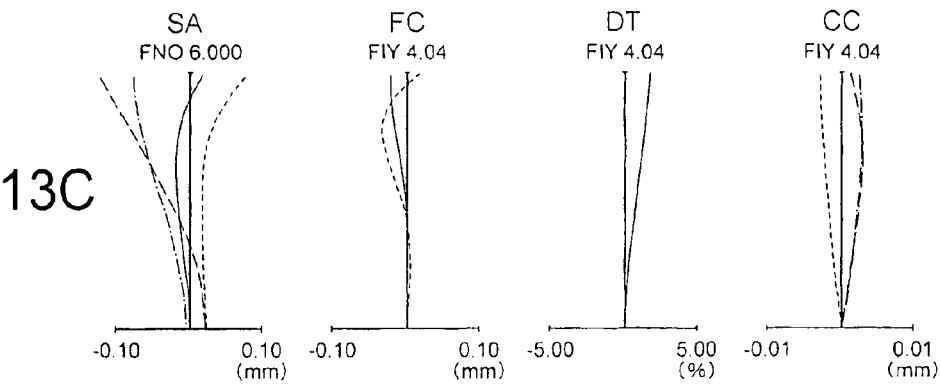
Figure 14A:
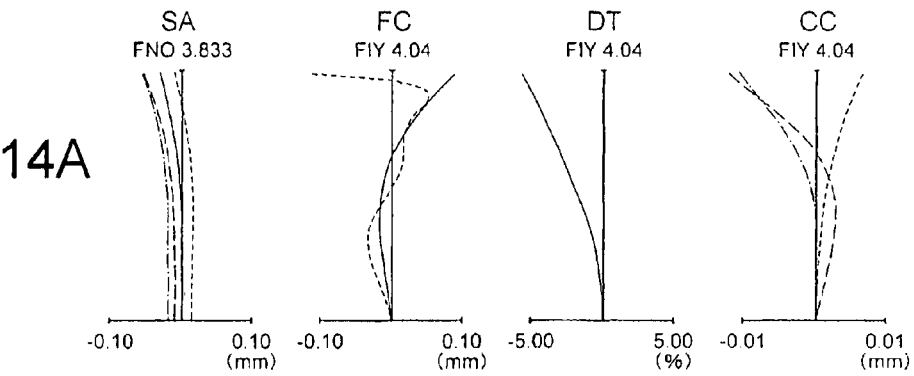
FIGS. 14A to 14C are aberration diagrams of Example 5 when focused on the infinite object.
Figure 14B:
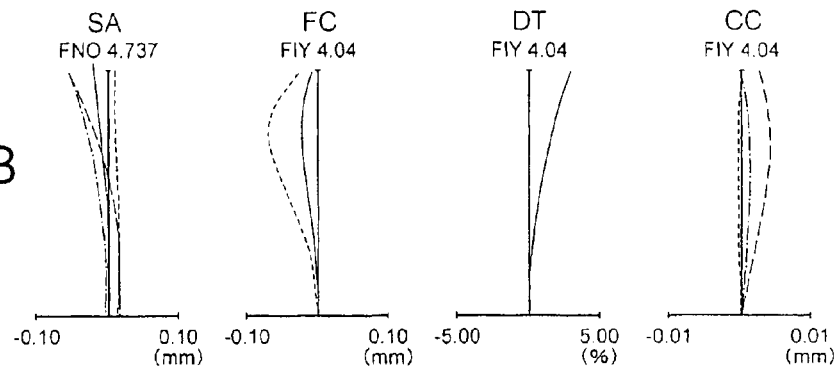
Figure 14C:
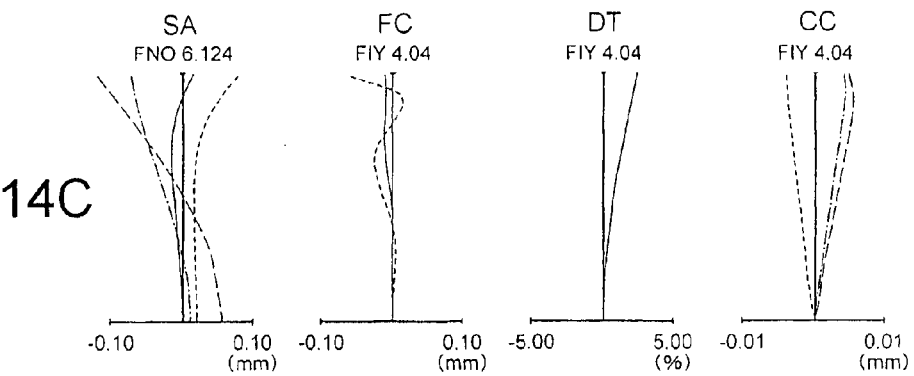
Figure 15A:
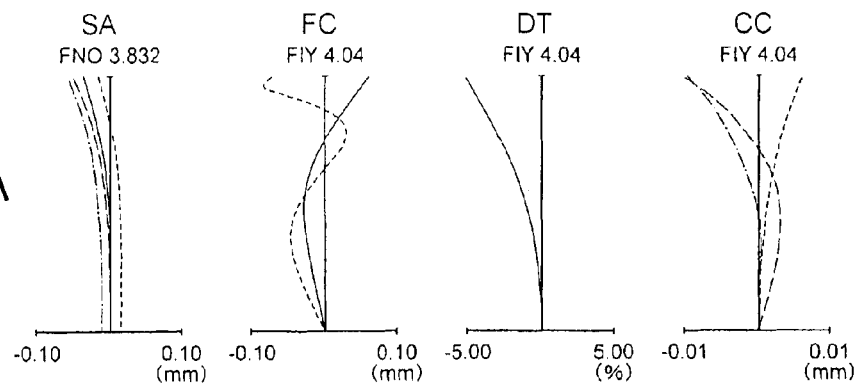
FIGS. 15A to 15C are aberration diagrams of Example 6 when focused on the infinite object.
Figure 15B:
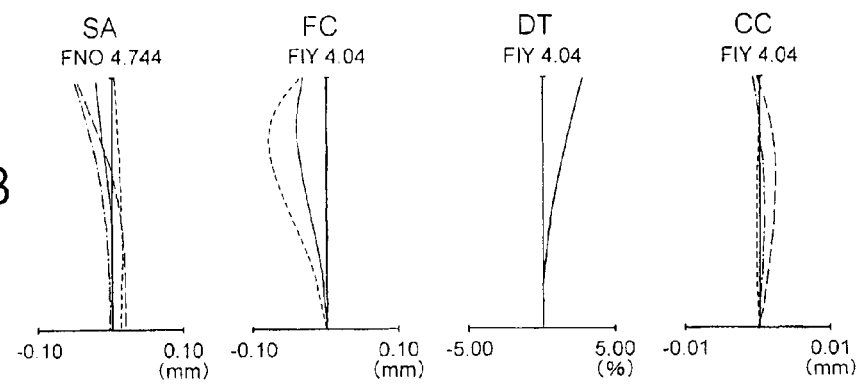
Figure 15C:
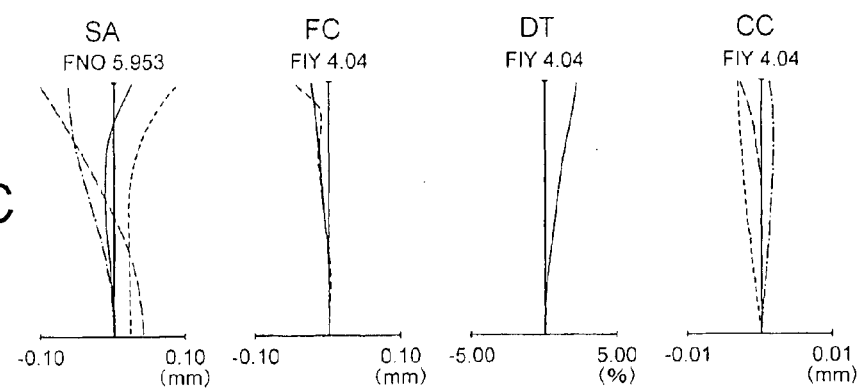
Figure 16A:
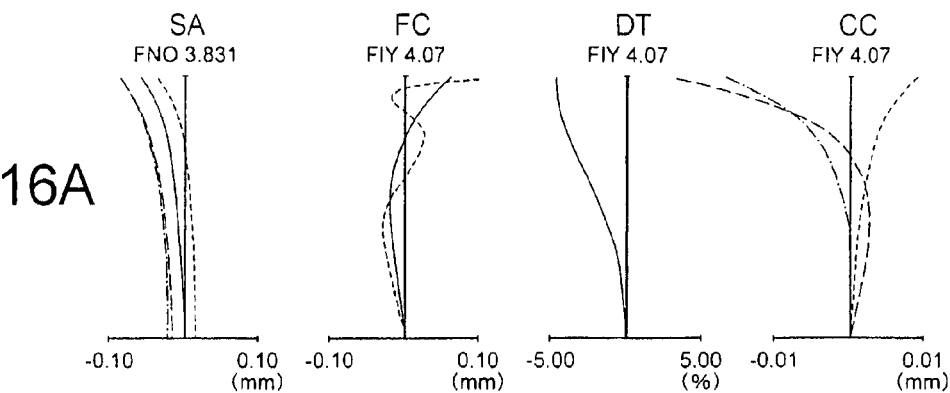
FIGS. 16A to 16C are aberration diagrams of Example 7 when focused on the infinite object.
Figure 16B:
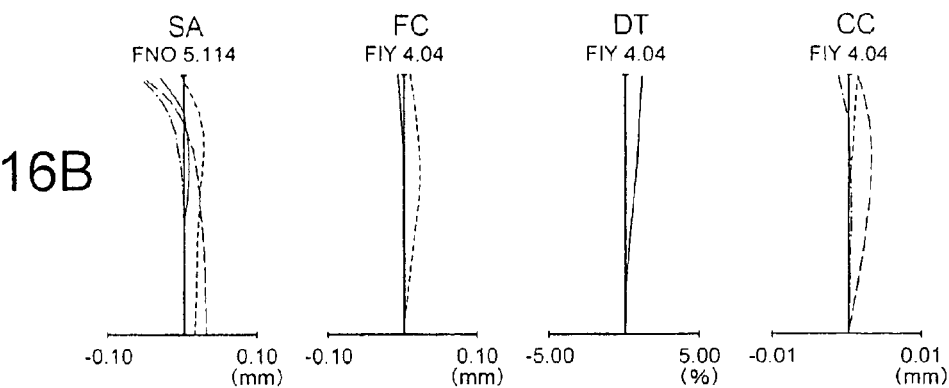
Figure 16C:
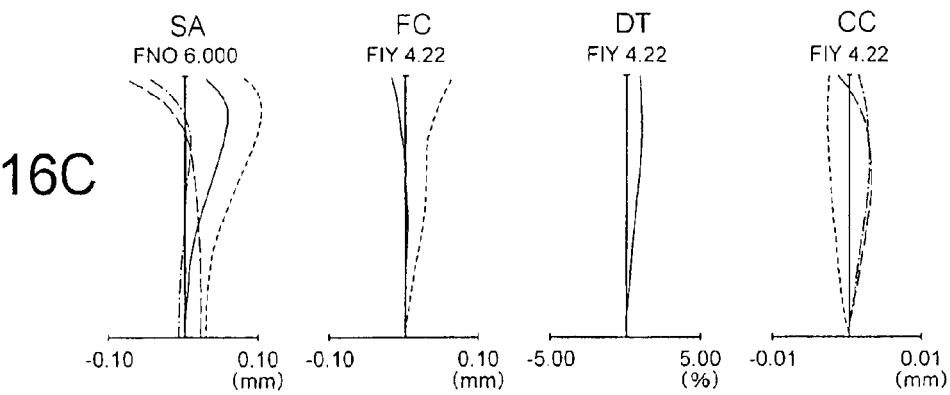
Figure 17A:
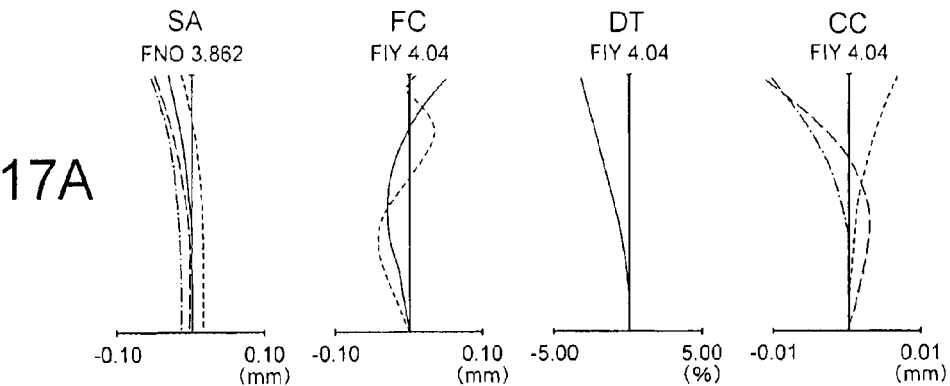
FIGS. 17A to 17C are aberration diagrams of Example 8 when focused on the infinite object.
Figure 17B:
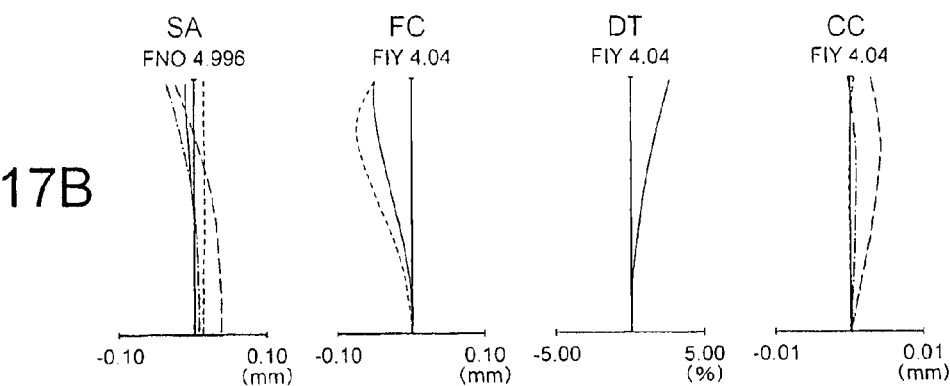
Figure 17C:
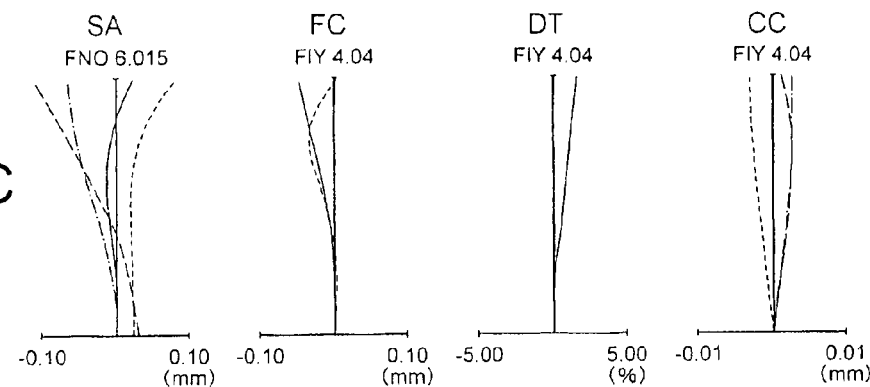
Figure 18A:
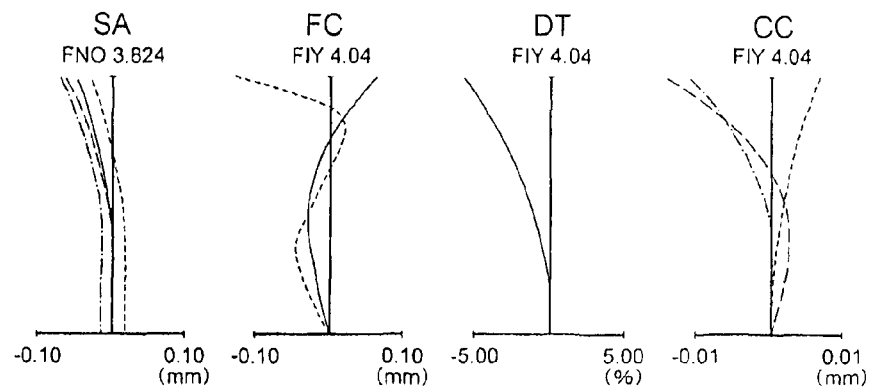
FIGS. 18A to 18C are aberration diagrams of Example 9 when focused on the infinite object.
Figure 18B:
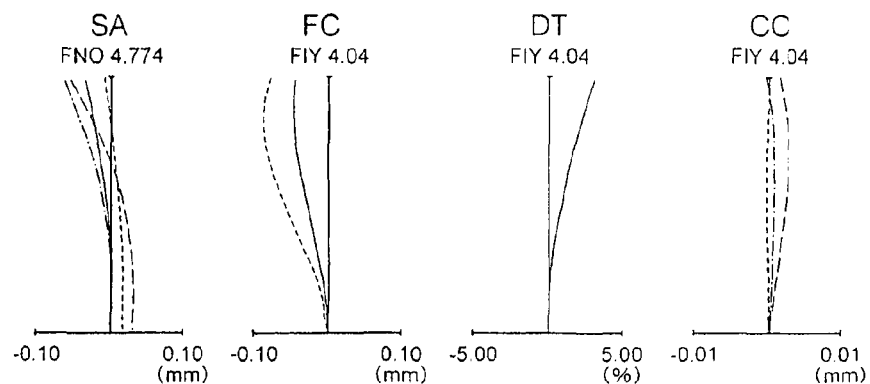
Figure 18C:
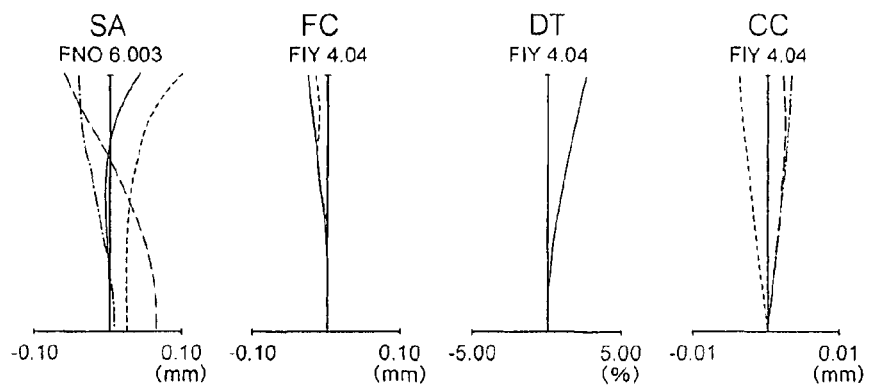

As shown in FIGS. 9A to 9C, Example 9 includes, in order from an object side, a first lens unit G1 having a positive refractive power, a second lens unit G2 having a negative refractive power, an aperture stop S, a third lens unit G3 having a positive refractive power and a fourth lens unit G4 having a positive refractive power.

During magnification change from a wide-angle end to a telephoto end, the first lens unit G1 moves toward the object side, the second lens unit G2 once moves toward an image side and then reverses its movement direction to move toward the object side, the third lens unit G3 moves toward the object side, and the fourth lens unit G4 once moves toward the object side and then reverses its movement direction to move toward the image side.

During focusing on an object disposed at a short distance, the fourth lens unit G4 moves along the optical axis.

The first lens unit G1 includes a first negative meniscus lens whose convex surface faces the object side and a second double convex lens in order from the object side. An air lens is formed between the first negative meniscus lens and the second double convex lens. The second lens unit G2 includes a third double concave negative lens and a fourth positive meniscus lens whose convex surface faces the object side in order from the object side. The third lens unit G3 includes a fifth double convex positive lens, a sixth double convex positive lens and a seventh double concave negative lens in order from the object side. The sixth double convex positive lens and the seventh double concave negative lens are cemented. The fourth lens unit G4 includes an eighth double convex positive lens.

Aspherical surfaces are used on five surfaces including opposite surfaces of the third double concave negative lens, opposite surfaces of the fifth double convex positive lens and an object-side surface of the eighth double convex positive lens.

Next, numerical data of the above examples will be described. In addition to the above symbols, f is a focal length of the zoom lens system, $F_{NO}$ is the F-number, $\omega$ is a half angle of view, WE is a wide-angle end, ST is an intermediate position, TE is a telephoto end, R is a radius of curvature of each lens surface, D is a space between the lens surfaces, Nd is a refractive index for the d-line of each lens, and Vd is the Abbe number of each lens. A shape of the aspherical surface is represented by the following equation in a coordinate system in which an intersection between the surface and the optical axis is an origin, an optical axis is an x-axis (a light traveling direction is a positive direction), and a y-axis passes through the origin and crosses the x-axis at right angles:

$$x(y^2/r)/[1+\{1-(K+1)(y/r)^2\}^{1/2}]+A_4y^4+A_6y^6+A_8y^8+A_{10}y^{10}+A_{12}y^{12},$$

in which r is a paraxial radius of curvature, K is a conic constant, and $A_4, A_6, A_8, A_{10}$ and $A_{12}$ are 4-th, 6-th, 8-th, 10-th and 12-th order aspherical coefficients. Among the aspherical coefficients, "e-n" (n is an integer) means "$10^{-n}$".

Example 1

| Surface Number | R | D | Nd | Vd |
| --- | --- | --- | --- | --- |
| 1 | 21.447 | 0.80 | 1.92286 | 18.90 |
| 2 | 16.568 | 0.33 | | |
| 3 | 19.065 | 3.00 | 1.72916 | 54.68 |
| 4 | −635.214 | (variable) | | |
| 5(AS) | −27.371 | 1.00 | 1.88300 | 40.76 |
| 6(AS) | 5.547 | 1.71 | | |
| 7 | 10.368 | 2.16 | 1.92286 | 18.90 |
| 8 | 32.087 | (variable) | | |
| 9(STOP) | ∞ | 0.10 | | |
| 10(AS) | 4.015 | 2.14 | 1.58313 | 59.38 |
| 11(AS) | −20.737 | 0.07 | | |
| 12 | 6.067 | 1.07 | 1.92286 | 20.88 |
| 13 | 3.042 | (variable) | | |
| 14(AS) | 13.673 | 2.68 | 1.52542 | 55.78 |
| 15 | −65.892 | (variable) | | |
| 16 | ∞ | 0.50 | 1.54771 | 62.84 |
| 17 | ∞ | 0.50 | | |
| 18 | ∞ | 0.50 | 1.51633 | 64.14 |
| 19 | ∞ | 0.50 | | |
| 20(image surface) | ∞ | | | |

| | Aspherical coefficient | | | | |
| --- | --- | --- | --- | --- | --- |
| | 5th surface | 6th surface | 10th surface | 11th surface | 14th surface |
| R | −27.371 | 5.547 | 4.015 | −20.737 | 13.673 |
| K | 0.065 | −0.216 | −0.052 | 0.000 | −0.880 |
| $A_4$ | 2.93685e−04 | −2.74527e−04 | −1.29073e−03 | 7.99142e−04 | 3.32538e−05 |
| $A_6$ | −1.29521e−05 | 5.81879e−06 | −6.12402e−06 | 6.56260e−05 | 3.03636e−05 |
| $A_8$ | 2.63539e−07 | −2.46028e−06 | 1.86699e−06 | 4.48582e−06 | −2.12591e−06 |
| $A_{10}$ | −7.77717e−10 | 7.68048e−08 | | | 6.32654e−08 |

Zoom Data (∞)

|  | WE | ST | TE |
|---|---|---|---|
| f(mm) | 6.60 | 14.49 | 31.76 |
| $F_{NO}$ | 4.47 | 5.71 | 5.99 |
| 2ω(°) | 62.67 | 29.43 | 13.60 |
| $d_4$ | 1.18 | 7.61 | 17.27 |
| $d_8$ | 12.07 | 5.03 | 0.55 |
| $d_{13}$ | 4.74 | 8.30 | 9.73 |
| $d_{15}$ | 3.31 | 4.30 | 3.77 |

Focus Data

|  | WE | ST | TE |
|---|---|---|---|
| Object distance (cm) | 20 | 40 | 60 |
| $d_{13}$ | 4.34011 | 7.4604 | 7.25232 |
| $d_{15}$ | 3.71058 | 5.13356 | 6.25527 |

Example 2

| Surface Number | R | D | Nd | Vd |
|---|---|---|---|---|
| 1 | 22.824 | 0.80 | 1.84666 | 23.78 |
| 2 | 14.601 | 2.82 | 1.72916 | 54.68 |
| 3 | 414.790 | (variable) | | |
| 4(AS) | −19.623 | 0.90 | 1.80495 | 40.90 |
| 5(AS) | 5.406 | 1.71 | | |
| 6 | 8.975 | 2.07 | 1.92286 | 18.90 |
| 7 | 20.246 | (variable) | | |
| 8(STOP) | ∞ | 0.10 | | |
| 9(AS) | 5.364 | 2.57 | 1.58313 | 59.38 |
| 10(AS) | −16.396 | 0.10 | | |
| 11 | 8.877 | 2.16 | 1.72916 | 54.68 |
| 12 | −5.099 | 0.40 | 1.80100 | 34.97 |
| 13 | 4.240 | (variable) | | |
| 14(AS) | 11.188 | 2.14 | 1.52542 | 55.78 |
| 15 | −171.452 | (variable) | | |
| 16 | ∞ | 0.50 | 1.54771 | 62.84 |
| 17 | ∞ | 0.50 | | |
| 18 | ∞ | 0.50 | 1.51633 | 64.14 |
| 19 | ∞ | 0.50 | | |
| 20(image surface) | ∞ | | | |

| Aspherical coefficient | | | | |
|---|---|---|---|---|
|  | 4th surface | 5th surface | 9th surface | 10th surface | 14th surface |
| R | −19.623 | 5.406 | 5.364 | −16.396 | 11.188 |
| K | 0.089 | −0.329 | −0.166 | 0.000 | −1.490 |
| $A_4$ | 8.04207e−04 | 4.28184e−04 | −2.03573e−04 | 9.35195e−04 | 5.63156e−05 |
| $A_6$ | −2.03534e−05 | 2.10097e−05 | 4.18417e−05 | 6.75272e−05 | 1.24846e−05 |
| $A_8$ | 2.82387e−07 | −1.65174e−06 | 3.69979e−06 | 5.30410e−06 | −1.04700e−06 |
| $A_{10}$ | −1.69194e−09 | 1.28854e−08 | | | 3.12395e−08 |

Zoom Data (∞)

|  | WE | ST | TE |
|---|---|---|---|
| f(mm) | 6.61 | 14.38 | 31.74 |
| $F_{NO}$ | 3.60 | 4.46 | 6.02 |
| 2ω(°) | 62.90 | 29.44 | 13.45 |
| $d_3$ | 1.26 | 7.82 | 13.73 |
| $d_7$ | 12.51 | 5.36 | 1.54 |
| $d_{13}$ | 4.42 | 6.52 | 14.10 |
| $d_{15}$ | 2.69 | 4.42 | 3.00 |

Focus Data

|  | WE | ST | TE |
|---|---|---|---|
| Object distance (cm) | 20 | 40 | 60 |
| $d_{13}$ | 4.00992 | 5.74406 | 11.59488 |
| $d_{15}$ | 3.1137 | 5.20177 | 5.50088 |

Example 3

| Surface Number | R | D | Nd | Vd |
|---|---|---|---|---|
| 1 | 18.267 | 0.80 | 1.84666 | 23.78 |
| 2 | 12.871 | 0.32 | | |
| 3 | 13.474 | 2.99 | 1.69680 | 55.53 |
| 4 | 200.326 | (variable) | | |
| 5(AS) | −25.331 | 1.00 | 1.80495 | 40.90 |
| 6(AS) | 4.706 | 1.64 | | |
| 7 | 8.093 | 2.16 | 1.92286 | 18.90 |
| 8 | 17.200 | (variable) | | |
| 9(STOP) | ∞ | 0.10 | | |
| 10(AS) | 5.328 | 2.14 | 1.58313 | 59.38 |
| 11(AS) | −12.904 | 0.10 | | |
| 12 | 13.257 | 1.41 | 1.69680 | 55.53 |
| 13 | −13.257 | 0.80 | 1.68893 | 31.07 |
| 14 | 4.281 | (variable) | | |
| 15(AS) | 15.208 | 2.26 | 1.52542 | 55.78 |
| 16 | −29.575 | (variable) | | |
| 17 | ∞ | 0.50 | 1.54771 | 62.84 |
| 18 | ∞ | 0.50 | | |

-continued

| Surface Number | R | D | Nd | Vd |
|---|---|---|---|---|
| 19 | ∞ | 0.50 | 1.51633 | 64.14 |
| 20 | ∞ | 0.49 | | |
| 21(image surface) | ∞ | | | |

| Aspherical coefficient | | | | | |
|---|---|---|---|---|---|
| | 5th surface | 6th surface | 10th surface | 11th surface | 15th surface |
| R | −25.331 | 4.706 | 5.328 | −12.904 | 15.208 |
| K | 0.089 | −0.296 | −0.166 | 0.000 | −1.490 |
| $A_4$ | 6.99130e−04 | 1.79880e−04 | −4.29810e−04 | 1.01731e−03 | 5.63156e−05 |
| $A_6$ | −2.66634e−05 | 1.54509e−05 | 2.92590e−05 | 2.95209e−05 | −7.43659e−06 |
| $A_8$ | 5.48190e−07 | −3.56752e−06 | 4.35260e−06 | 1.04258e−05 | 7.17793e−07 |
| $A_{10}$ | −4.25249e−09 | 7.97263e−08 | 4.57241e−07 | 3.52701e−07 | −1.89625e−08 |

Zoom Data (∞)

| | WE | ST | TE |
|---|---|---|---|
| f(mm) | 6.61 | 14.33 | 31.69 |
| $F_{NO}$ | 3.74 | 4.96 | 5.76 |
| 2ω(°) | 62.49 | 29.40 | 13.56 |
| $d_4$ | 1.15 | 7.09 | 13.79 |
| $d_8$ | 11.78 | 6.32 | 1.55 |

-continued

| Surface Number | R | D | Nd | Vd |
|---|---|---|---|---|
| 14 | 4.129 | (variable) | | |
| 15(AS) | 12.407 | 2.42 | 1.52542 | 55.78 |
| 16 | −41.598 | (variable) | | |
| 17 | ∞ | 0.50 | 1.54771 | 62.84 |
| 18 | ∞ | 0.50 | | |
| 19 | ∞ | 0.50 | 1.51633 | 64.14 |
| 20 | ∞ | 0.50 | | |
| 21(image surface) | ∞ | | | |

| Aspherical coefficient | | | | | |
|---|---|---|---|---|---|
| | 5th surface | 6th surface | 10th surface | 11th surface | 14th surface |
| R | −23.498 | 4.753 | 5.125 | −14.256 | 12.407 |
| K | 0.089 | −0.296 | −0.166 | 0.000 | −1.490 |
| $A_4$ | 8.39748e−04 | 3.53665e−04 | −4.04244e−04 | 1.08996e−03 | 5.63156e−05 |
| $A_6$ | −3.07171e−05 | 1.63037e−05 | 4.99196e−05 | 6.53901e−05 | 6.15610e−06 |
| $A_8$ | 5.94210e−07 | −3.23099e−06 | 2.29378e−06 | 6.81316e−06 | −1.85805e−07 |
| $A_{10}$ | −4.70589e−09 | 5.18519e−08 | 7.26264e−07 | 8.99070e−07 | 2.56016e−09 |

-continued

| | WE | ST | TE |
|---|---|---|---|
| $d_{14}$ | 5.01 | 10.35 | 13.81 |
| $d_{16}$ | 3.35 | 2.88 | 3.31 |

Focus Data

| | WE | ST | TE |
|---|---|---|---|
| Object distance (cm) | 20 | 40 | 60 |
| $d_{14}$ | 4.62131 | 9.44031 | 11.3825 |
| $d_{16}$ | 3.73802 | 3.80088 | 5.72691 |

Example 4

| Surface Number | R | D | Nd | Vd |
|---|---|---|---|---|
| 1 | 18.456 | 0.80 | 1.84666 | 23.78 |
| 2 | 12.647 | 0.32 | | |
| 3 | 13.355 | 3.00 | 1.72916 | 54.68 |
| 4 | 386.792 | (variable) | | |
| 5(AS) | −23.498 | 1.00 | 1.80495 | 40.90 |
| 6(AS) | 4.753 | 1.61 | | |
| 7 | 7.926 | 2.16 | 1.92286 | 18.90 |
| 8 | 16.440 | (variable) | | |
| 9(STOP) | ∞ | 0.10 | | |
| 10(AS) | 5.125 | 2.14 | 1.58313 | 59.38 |
| 11(AS) | −14.256 | 0.10 | | |
| 12 | 13.351 | 1.41 | 1.69680 | 55.53 |
| 13 | −13.351 | 0.84 | 1.68893 | 31.07 |

Zoom Data (∞)

| | WE | ST | TE |
|---|---|---|---|
| f(mm) | 6.61 | 14.33 | 31.71 |
| $F_{NO}$ | 3.85 | 5.00 | 6.00 |
| 2ω(°) | 62.01 | 29.33 | 13.61 |
| $d_4$ | 1.07 | 6.71 | 12.35 |
| $d_8$ | 12.02 | 6.56 | 1.57 |
| $d_{14}$ | 4.56 | 9.70 | 13.86 |
| $d_{16}$ | 3.46 | 3.11 | 3.22 |

Focus Data

| | WE | ST | TE |
|---|---|---|---|
| Object distance (cm) | 20 | 40 | 60 |
| $d_{14}$ | 4.2014 | 8.8697 | 11.53444 |
| $d_{16}$ | 3.85828 | 3.91663 | 5.56562 |

Example 5

| Surface Number | R | D | Nd | Vd |
|---|---|---|---|---|
| 1 | 19.018 | 0.80 | 1.84666 | 23.78 |
| 2 | 12.782 | 0.32 | | |

-continued

| Surface Number | R | D | Nd | Vd |
|---|---|---|---|---|
| 3 | 13.398 | 3.00 | 1.72916 | 54.68 |
| 4 | −63631.002 | (variable) | | |
| 5(AS) | −21.481 | 1.00 | 1.80495 | 40.90 |
| 6(AS) | 4.772 | 1.48 | | |
| 7 | 7.677 | 2.16 | 1.92286 | 18.90 |
| 8 | 15.641 | (variable) | | |
| 9(STOP) | ∞ | 0.10 | | |
| 10(AS) | 5.096 | 2.14 | 1.58313 | 59.38 |
| 11(AS) | −14.327 | 0.10 | | |
| 12 | 13.093 | 1.41 | 1.69680 | 55.53 |
| 13 | −13.093 | 0.84 | 1.68893 | 31.07 |
| 14 | 4.197 | (variable) | | |
| 15(AS) | 11.690 | 2.29 | 1.52542 | 55.78 |
| 16 | −97.671 | (variable) | | |
| 17 | ∞ | 0.50 | 1.54771 | 62.84 |
| 18 | ∞ | 0.50 | | |
| 19 | ∞ | 0.50 | 1.51633 | 64.14 |
| 20 | ∞ | 0.50 | | |
| 21(image surface) | ∞ | | | |

Aspherical coefficient

| | 5th surface | 6th surface | 10th surface | 11th surface | 15th surface |
|---|---|---|---|---|---|
| R | −21.481 | 4.772 | 5.096 | −14.327 | 11.690 |
| K | 0.089 | −0.296 | −0.166 | 0.000 | −1.490 |
| $A_4$ | 5.95706e-04 | 1.25946e-04 | −4.09470e-04 | 1.12365e-03 | 5.63156e-05 |
| $A_6$ | −1.00942e-05 | 2.71574e-05 | 8.52393e-05 | 1.22121e-04 | 1.24063e-05 |
| $A_8$ | −1.85720e-08 | −1.58602e-06 | −5.52668e-06 | −8.47621e-06 | −7.62267e-07 |
| $A_{10}$ | 1.76366e-09 | −2.36532e-08 | 1.68277e-06 | 3.05181e-06 | 1.77234e-08 |

Zoom Data (∞)

| | WE | ST | TE |
|---|---|---|---|
| f(mm) | 6.60 | 14.36 | 31.69 |
| $F_{NO}$ | 3.83 | 4.74 | 6.12 |
| 2ω(°) | 63.15 | 29.28 | 13.54 |
| $d_4$ | 1.06 | 7.02 | 11.56 |
| $d_8$ | 11.93 | 6.08 | 1.53 |
| $d_{14}$ | 4.68 | 8.08 | 14.20 |
| $d_{16}$ | 3.22 | 3.55 | 3.10 |

Focus Data

| | WE | ST | TE |
|---|---|---|---|
| Object distance (cm) | 20 | 40 | 60 |
| $d_{14}$ | 4.30099 | 7.25426 | 11.73087 |
| $d_{16}$ | 3.65889 | 4.45588 | 5.61716 |

Example 6

| Surface Number | R | D | Nd | Vd |
|---|---|---|---|---|
| 1 | 17.291 | 0.80 | 1.92286 | 18.90 |
| 2 | 13.295 | 0.32 | | |
| 3 | 14.516 | 3.00 | 1.72916 | 54.68 |
| 4 | 303.290 | (variable) | | |
| 5(AS) | −21.320 | 1.00 | 1.80495 | 40.90 |
| 6(AS) | 4.685 | 1.50 | | |

-continued

| Surface Number | R | D | Nd | Vd |
|---|---|---|---|---|
| 7 | 7.818 | 2.16 | 1.92286 | 18.90 |
| 8 | 17.094 | (variable) | | |
| 9(STOP) | ∞ | 0.10 | | |
| 10(AS) | 5.201 | 2.14 | 1.58313 | 59.38 |
| 11(AS) | −15.241 | 0.10 | | |
| 12 | 12.714 | 1.41 | 1.69680 | 55.53 |
| 13 | −12.714 | 0.84 | 1.68893 | 31.07 |
| 14 | 4.262 | (variable) | | |
| 15(AS) | 12.250 | 2.42 | 1.52542 | 55.78 |
| 16 | −41.640 | (variable) | | |
| 17 | ∞ | 0.50 | 1.54771 | 62.84 |
| 18 | ∞ | 0.50 | | |
| 19 | ∞ | 0.50 | 1.51633 | 64.14 |
| 20 | ∞ | 0.49 | | |
| 21(image surface) | ∞ | | | |

Aspherical coefficient

| | 5th surface | 6th surface | 10th surface | 11th surface | 15th surface |
|---|---|---|---|---|---|
| R | −21.320 | 4.685 | 5.201 | −15.241 | 12.250 |
| K | 0.089 | −0.296 | −0.166 | 0.000 | −1.490 |
| $A_4$ | 8.88562e-04 | 3.53825e-04 | −3.20762e-04 | 1.10693e-03 | 5.63156e-05 |
| $A_6$ | −3.61869e-05 | 9.08035e-06 | 6.33467e-05 | 8.64868e-05 | 4.10541e-06 |
| $A_8$ | 7.83290e-07 | −3.61053e-06 | 7.37339e-07 | 2.95171e-06 | −1.71153e-07 |
| $A_{10}$ | −6.76838e-09 | 7.27912e-08 | 9.18568e-07 | 1.47136e-06 | 3.86818e-09 |

Zoom Data (∞)

|  | WE | ST | TE |
|---|---|---|---|
| f(mm) | 6.61 | 14.33 | 31.69 |
| $F_{NO}$ | 3.83 | 4.74 | 5.95 |
| 2ω(°) | 62.76 | 29.34 | 13.57 |
| $d_4$ | 1.12 | 7.07 | 12.08 |
| $d_8$ | 12.14 | 6.20 | 1.56 |
| $d_{14}$ | 5.12 | 8.73 | 14.20 |
| $d_{16}$ | 3.12 | 3.64 | 3.25 |

Focus Data

|  | WE | ST | TE |
|---|---|---|---|
| Object distance (cm) | 20 | 40 | 60 |
| $d_{14}$ | 4.75712 | 7.95057 | 11.90631 |
| $d_{16}$ | 3.39173 | 4.39397 | 5.5506 |

Zoom Data (∞)

|  | WE | ST | TE |
|---|---|---|---|
| f(mm) | 6.62 | 14.37 | 32.09 |
| $F_{NO}$ | 3.83 | 5.11 | 6.00 |
| 2ω(°) | 62.68 | 29.65 | 13.53 |
| $d_4$ | 0.88 | 5.76 | 12.75 |
| $d_8$ | 13.63 | 6.80 | 1.53 |
| $d_{14}$ | 4.27 | 9.62 | 13.30 |
| $d_{16}$ | 3.21 | 3.14 | 2.98 |

Focus Data

|  | WE | ST | TE |
|---|---|---|---|
| Object distance (cm) | 20 | 40 | 60 |
| $d_{14}$ | 3.8984 | 8.77503 | 10.85711 |
| $d_{16}$ | 3.56116 | 3.98912 | 5.42104 |

Example 7

| Surface Number | R | D | Nd | Vd |
|---|---|---|---|---|
| 1 | 23.457 | 0.80 | 1.84666 | 23.78 |
| 2 | 14.154 | 0.40 |  |  |
| 3 | 15.271 | 3.00 | 1.77250 | 49.60 |
| 4 | −215.758 | (variable) |  |  |
| 5(AS) | −23.097 | 1.00 | 1.80495 | 40.90 |
| 6(AS) | 5.348 | 1.40 |  |  |
| 7 | 8.580 | 2.00 | 1.92286 | 18.90 |
| 8 | 18.871 | (variable) |  |  |
| 9(STOP) | ∞ | 0.10 |  |  |
| 10(AS) | 5.766 | 2.45 | 1.58313 | 59.38 |
| 11(AS) | −10.882 | 0.10 |  |  |
| 12 | 15.328 | 1.44 | 1.69680 | 55.53 |
| 13 | −15.328 | 1.22 | 1.68893 | 31.07 |
| 14 | 4.089 | (variable) |  |  |
| 15(AS) | 14.324 | 2.60 | 1.52542 | 55.78 |
| 16 | −27.378 | (variable) |  |  |
| 17 | ∞ | 0.50 | 1.54771 | 62.84 |
| 18 | ∞ | 0.50 |  |  |
| 19 | ∞ | 0.50 | 1.51633 | 64.14 |
| 20 | ∞ | 0.43 |  |  |
| 21(image surface) | ∞ |  |  |  |

Example 8

| Surface Number | R | D | Nd | Vd |
|---|---|---|---|---|
| 1 | 18.475 | 0.80 | 1.84666 | 23.78 |
| 2 | 12.659 | 0.32 |  |  |
| 3 | 13.341 | 3.00 | 1.72916 | 54.68 |
| 4 | 371.472 | (variable) |  |  |
| 5(AS) | −27.809 | 1.04 | 1.88300 | 40.76 |
| 6(AS) | 5.100 | 1.59 |  |  |
| 7 | 8.182 | 2.16 | 1.92286 | 18.90 |
| 8 | 17.957 | (variable) |  |  |
| 9(STOP) | ∞ | 0.10 |  |  |
| 10(AS) | 5.153 | 2.14 | 1.58313 | 59.38 |
| 11(AS) | −14.137 | 0.10 |  |  |
| 12 | 13.221 | 1.41 | 1.69680 | 55.53 |
| 13 | −13.221 | 0.84 | 1.68893 | 31.07 |
| 14 | 4.132 | variable |  |  |
| 15(AS) | 12.698 | 2.41 | 1.52542 | 55.78 |
| 16 | −41.598 | variable |  |  |
| 17 | ∞ | 0.50 | 1.54771 | 62.84 |
| 18 | ∞ | 0.50 |  |  |
| 19 | ∞ | 0.50 | 1.51633 | 64.14 |
| 20 | ∞ | 0.50 |  |  |
| 21(image surface) | ∞ |  |  |  |

| Aspherical coefficient | | | | |
|---|---|---|---|---|
|  | 5th surface | 6th surface | 10th surface | 11th surface | 15th surface |
| R | −23.097 | 5.348 | 5.766 | −10.882 | 14.324 |
| K | 0.089 | −0.296 | −1.073 | 7.693 | −0.001 |
| $A_4$ | 1.80967e−04 | −1.84110e−04 | −9.79726e−05 | 1.32858e−03 | 4.02883e−05 |
| $A_6$ | −1.62280e−07 | 1.36361e−07 | 1.50579e−06 | 3.01907e−05 | 5.91976e−06 |
| $A_8$ | 3.96691e−08 | 1.68053e−07 |  | 2.16650e−08 | −1.61602e−07 |
| $A_{10}$ | −7.98836e−10 | −1.07186e−09 |  | 6.54410e−11 | 2.12392e−09 |

| Aspherical coefficient | | | | | |
|---|---|---|---|---|---|
| | 5th surface | 6th surface | 10th surface | 11th surface | 15th surface |
| R | −27.809 | 5.100 | 5.153 | −14.137 | 12.698 |
| K | 0.089 | −0.296 | −0.166 | 0.000 | −1.490 |
| $A_4$ | 7.84324e−04 | 4.61731e−04 | −4.27647e−04 | 1.04412e−03 | 5.63156e−05 |
| $A_6$ | −2.58647e−05 | 1.27444e−05 | 5.55642e−05 | 7.86314e−05 | 6.88079e−06 |
| $A_8$ | 4.69773e−07 | −1.82774e−06 | 2.56242e−07 | 1.87805e−06 | −2.59002e−07 |
| $A_{10}$ | −3.86741e−09 | 1.38991e−08 | 8.50934e−07 | 1.26639e−06 | 4.35421e−09 |

Zoom Data (∞)

| | WE | ST | TE |
|---|---|---|---|
| f(mm) | 6.61 | 14.30 | 31.79 |
| $F_{NO}$ | 3.86 | 5.00 | 6.02 |
| 2ω(°) | 61.87 | 29.41 | 13.58 |
| $d_4$ | 0.99 | 6.71 | 12.32 |
| $d_8$ | 12.00 | 6.59 | 1.53 |
| $d_{14}$ | 4.59 | 9.66 | 13.87 |
| $d_{16}$ | 3.48 | 3.09 | 3.26 |

Focus Data

| | WE | ST | TE |
|---|---|---|---|
| Object distance (cm) | 20 | 40 | 60 |
| $d_{14}$ | 4.23106 | 8.82335 | 11.51533 |
| $d_{16}$ | 3.84819 | 3.93244 | 5.61753 |

Example 9

Focus Data

| | WE | ST | TE |
|---|---|---|---|
| Object distance (cm) | 20 | 40 | 60 |
| $d_{14}$ | 4.23106 | 8.82335 | 11.51533 |
| $d_{16}$ | 3.84819 | 3.93244 | 5.61753 |

Example 9

| Surface Number | R | D | Nd | Vd |
|---|---|---|---|---|
| 1 | 18.613 | 0.83 | 2.00170 | 20.64 |
| 2 | 14.132 | 0.32 | | |
| 3 | 15.458 | 3.00 | 1.72916 | 54.68 |
| 4 | −7762.115 | (variable) | | |
| 5(AS) | −19.900 | 1.00 | 1.80495 | 40.90 |
| 6(AS) | 4.735 | 1.32 | | |
| 7 | 7.926 | 2.25 | 2.00170 | 20.64 |
| 8 | 18.204 | (variable) | | |
| 9(STOP) | ∞ | 0.10 | | |
| 10(AS) | 5.243 | 2.14 | 1.58313 | 59.38 |

| Aspherical coefficient | | | | | |
|---|---|---|---|---|---|
| | 5th surface | 6th surface | 10th surface | 11th surface | 15th surface |
| R | −27.809 | 5.100 | 5.153 | −14.137 | 12.698 |
| K | 0.089 | −0.296 | −0.166 | 0.000 | −1.490 |
| $A_4$ | 7.84324e−04 | 4.61731e−04 | −4.27647e−04 | 1.04412e−03 | 5.63156e−05 |
| $A_6$ | −2.58647e−05 | 1.27444e−05 | 5.55642e−05 | 7.86314e−05 | 6.88079e−06 |
| $A_8$ | 4.69773e−07 | −1.82774e−06 | 2.56242e−07 | 1.87805e−06 | −2.59002e−07 |
| $A_{10}$ | −3.86741e−09 | 1.38991e−08 | 8.50934e−07 | 1.26639e−06 | 4.35421e−09 |

Zoom Data (∞)

| | WE | ST | TE |
|---|---|---|---|
| f(mm) | 6.61 | 14.30 | 31.79 |
| $F_{NO}$ | 3.86 | 5.00 | 6.02 |
| 2ω(°) | 61.87 | 29.41 | 13.58 |
| $d_4$ | 0.99 | 6.71 | 12.32 |
| $d_8$ | 12.00 | 6.59 | 1.53 |
| $d_{14}$ | 4.59 | 9.66 | 13.87 |
| $d_{16}$ | 3.48 | 3.09 | 3.26 |

-continued

| Surface Number | R | D | Nd | Vd |
|---|---|---|---|---|
| 11(AS) | −14.423 | 0.10 | | |
| 12 | 13.297 | 1.41 | 1.69680 | 55.53 |
| 13 | −13.297 | 0.84 | 1.68893 | 31.07 |
| 14 | 4.302 | (variable) | | |
| 15(AS) | 12.620 | 2.32 | 1.52542 | 55.78 |
| 16 | −41.640 | (variable) | | |
| 17 | ∞ | 0.50 | 1.54771 | 62.84 |
| 18 | ∞ | 0.50 | | |
| 19 | ∞ | 0.50 | 1.51633 | 64.14 |
| 20 | ∞ | 0.48 | | |
| 21(image surface) | ∞ | | | |

|  | 5th surface | 6th surface | 10th surface | 11th surface | 15th surface |
|---|---|---|---|---|---|
| R | −19.900 | 4.735 | 5.243 | −14.423 | 12.620 |
| K | 0.089 | −0.296 | −0.166 | 0.000 | −1.490 |
| $A_4$ | 7.68359e-04 | 2.06227e-04 | −3.57087e-04 | 1.07710e-03 | 5.63156e-05 |
| $A_6$ | −2.74885e-05 | 1.05145e-05 | 6.29255e-05 | 7.69622e-05 | 3.25061e-06 |
| $A_8$ | 5.05160e-07 | −3.20724e-06 | −2.02800e-07 | 3.07399e-06 | −1.24032e-07 |
| $A_{10}$ | −3.51817e-09 | 5.51277e-08 | 1.01728e-06 | 1.50112e-06 | 2.58656e-09 |

Zoom Data (∞)

|  | WE | ST | TE |
|---|---|---|---|
| f(mm) | 6.62 | 14.41 | 31.64 |
| $F_{NO}$ | 3.82 | 4.77 | 6.00 |
| 2ω(°) | 62.97 | 29.10 | 13.54 |
| $d_4$ | 1.12 | 7.18 | 12.54 |
| $d_8$ | 12.66 | 6.25 | 1.55 |
| $d_{14}$ | 5.19 | 8.85 | 14.31 |
| $d_{16}$ | 3.03 | 3.59 | 3.19 |

Focus Data

|  | WE | ST | TE |
|---|---|---|---|
| Object distance (cm) | 20 | 40 | 60 |
| $d_{14}$ | 4.8125 | 8.04135 | 11.95931 |
| $d_{16}$ | 3.41069 | 4.37078 | 5.54098 |

FIGS. 10A to 18C are aberration diagrams of Examples 1 to 9 when focused on an infinite object. In these drawings, FIGS. 10A, 11A, 12A, . . . show a spherical aberration (SA), an astigmatism (FC), a distortion (DT) and a chromatic aberration of magnification (CC) in a wide-angle end, FIGS. 10B, 11B, 12B, . . . show the aberrations in an intermediate sate, and FIGS. 10C, 11C, 12C, . . . show the aberrations in a telephoto end. In the drawings, "FIY" is a maximum image height.

Values of the conditions (1) to (15) of the examples areas follows:

|  | Example 1 | Example 2 | Example 3 | Example 4 | Example 5 | Example 6 | Example 7 | Example 8 | Example 9 |
|---|---|---|---|---|---|---|---|---|---|
| Condition (1) | 1.161 | 1.145 | 1.065 | 0.974 | 0.948 | 0.967 | 1.010 | 0.972 | 1.021 |
| Condition (2) | 0.663 | 0.568 | 0.687 | 0.663 | 0.636 | 0.640 | 0.624 | 0.690 | 0.616 |
| Condition (3) | 0.054 | 0.059 | 0.086 | 0.083 | 0.079 | 0.084 | 0.057 | 0.059 | 0.090 |
| Condition (4) | 1.883 | 1.80495 | 1.80495 | 1.80495 | 1.80495 | 1.80495 | 1.80495 | 1.883 | 1.80495 |
| Condition (5) | 1.92286 | 1.92286 | 1.92286 | 1.92286 | 1.92286 | 1.92286 | 1.92286 | 1.92286 | 2.0017 |
| Condition (6) | 40.76 | 40.9 | 40.9 | 40.9 | 40.9 | 40.9 | 40.9 | 40.76 | 40.9 |
| Condition (7) | 18.9 | 18.9 | 18.9 | 18.9 | 18.9 | 18.9 | 18.9 | 18.9 | 20.644 |
| Condition (8) | −0.942 | −1.073 | −1.144 | −1.072 | −1.000 | −1.101 | −0.868 | −1.075 | −0.996 |
| Condition (9) | −14.273 | — | −43.696 | −36.737 | −42.527 | −22.776 | −26.339 | −38.107 | −22.313 |
| Condition (10) | −0.676 | −0.51 | −0.416 | −0.471 | −0.475 | −0.491 | −0.307 | −0.466 | −0.467 |
| Condition (11) | −0.273 | −0.266 | −0.248 | −0.246 | −0.240 | −0.242 | −0.270 | −0.245 | −0.255 |
| Condition (12) | 0.326 | 0.314 | 0.322 | 0.329 | 0.318 | 0.326 | 0.333 | 0.327 | 0.328 |
| Condition (13) | 0.687 | 0.632 | 0.614 | 0.583 | 0.632 | 0.577 | 0.570 | 0.591 | 0.591 |
| Condition (14) | 0.005 | 0.00000 | 0.00028 | 0.00059 | 0.00047 | 0.00007 | 0.00263 | 0.00073 | 0.00006 |
| Condition (15) | 4.810 | 4.800 | 4.794 | 4.797 | 4.800 | 4.795 | 4.848 | 4.808 | 4.781 |

Next, a digital camera to which the zoom lens system of the present invention is applied will be described as an example of an electronic image pickup apparatus of the present invention.

Figure 19:
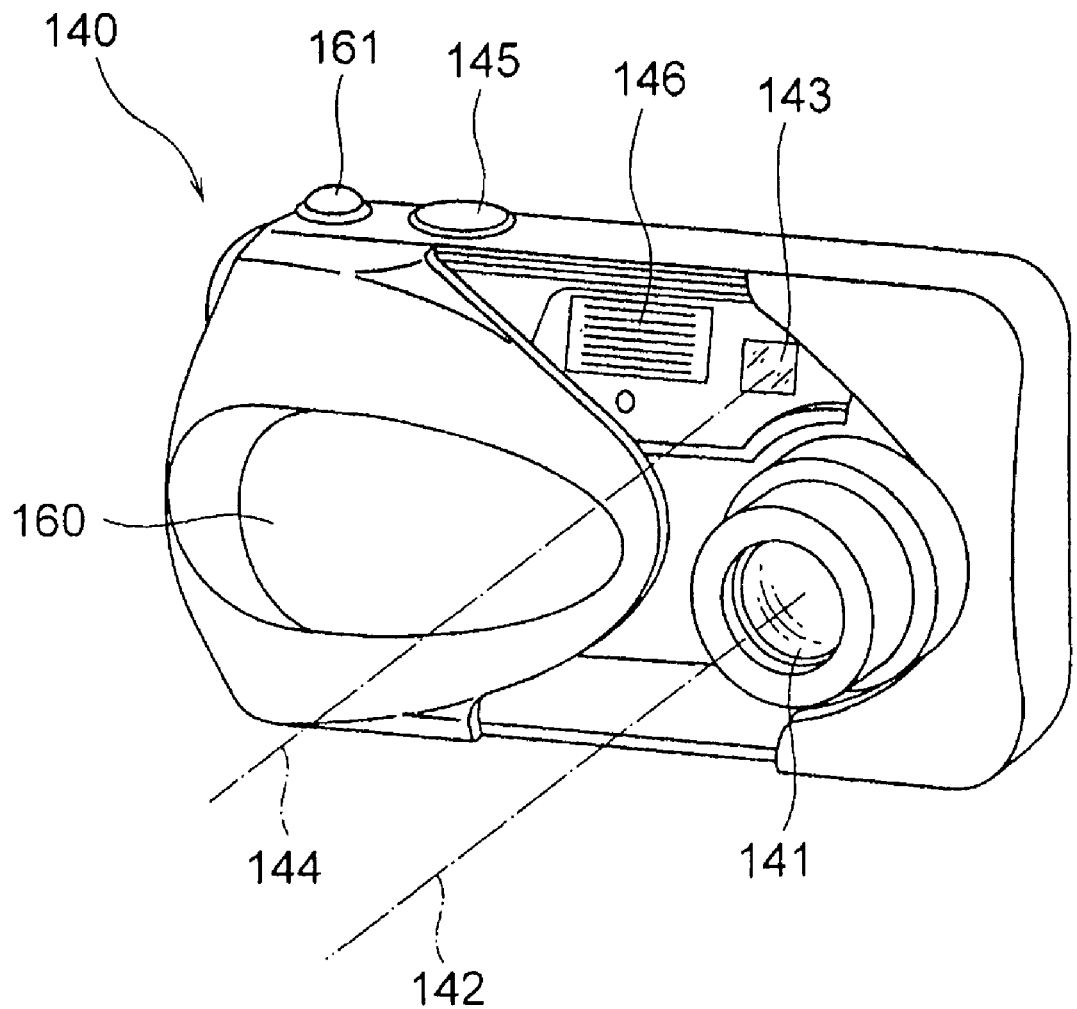
FIG. 19 is a front perspective view showing an appearance of an example of a digital camera of the present invention.
Figure 20:
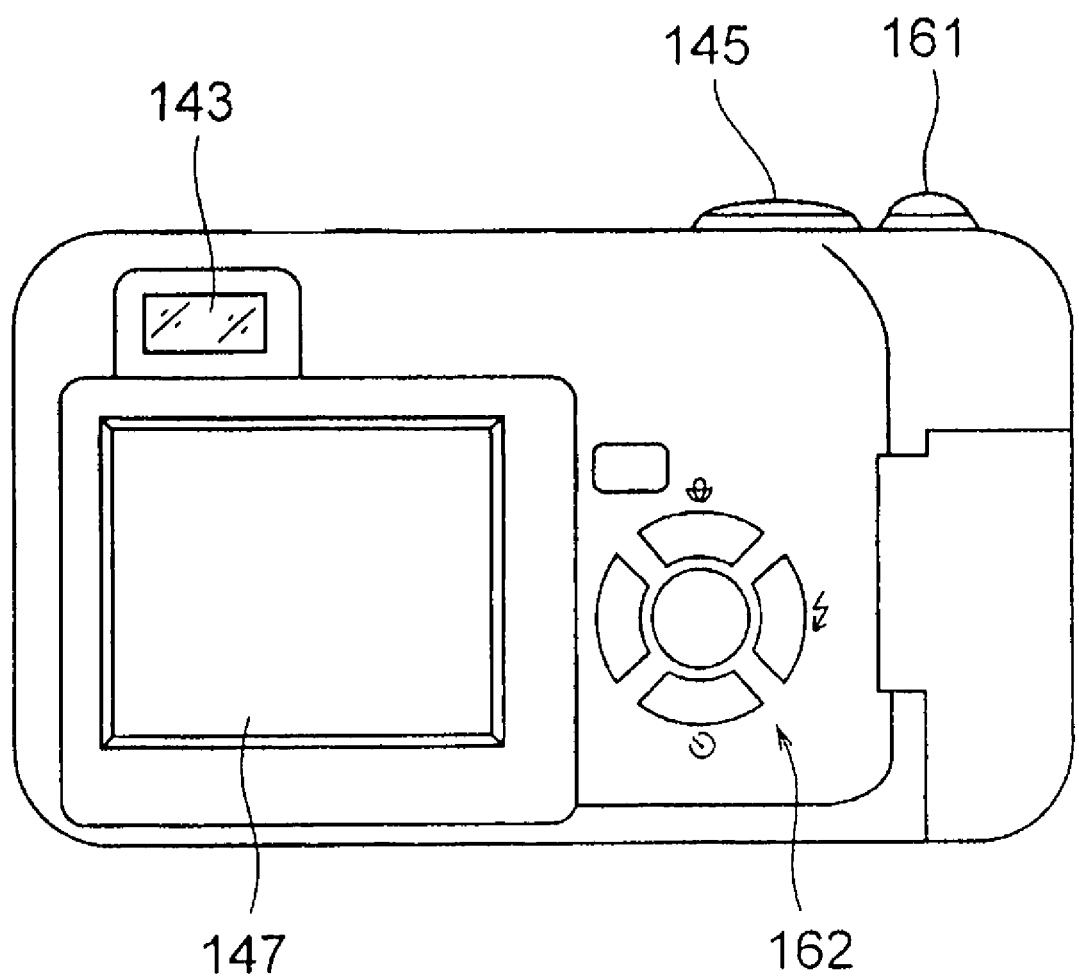
FIG. 20 is a rear view of the digital camera of FIG. 19.
Figure 21:
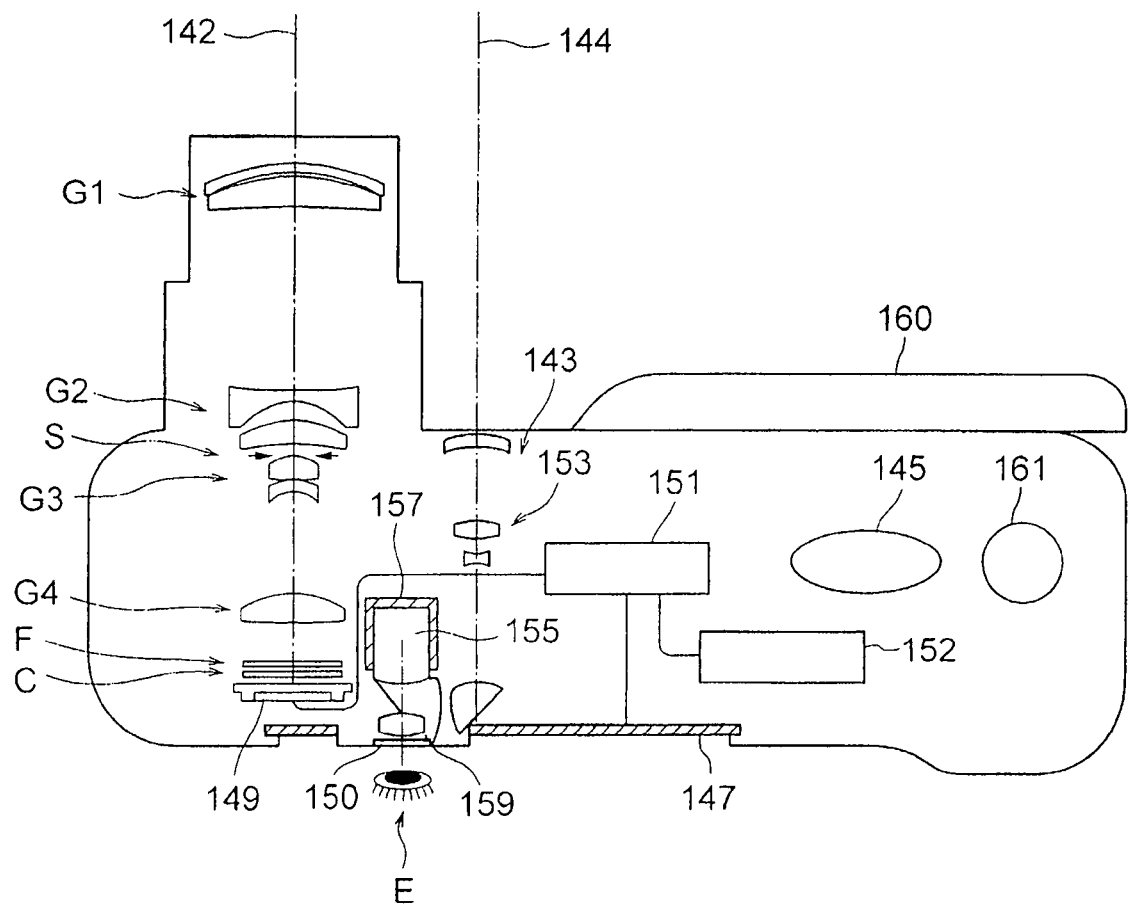
FIG. 21 is a schematic sectional view of the digital camera of FIG. 19.

FIGS. 19 to 21 are conceptual diagrams showing a constitution of a digital camera to which the zoom lens system of the present invention is applied. FIG. 19 is a front perspective view showing an appearance of a digital camera; FIG. 20 is a rear view of the digital camera of FIG. 19; and FIG. 21 is a schematic sectional view showing the digital camera of FIG. 19. FIGS. 19 and 21 show a collapsed state of a photographing optical system.

A digital camera 140 includes a photographing optical system 141 having an optical path 142 for photographing; a finder optical system 143 having an optical path 144 for a finder; a shutter release button 145; a flash lamp 146; a liquid crystal display monitor 147; a focal length change button 161; a setting change switch 162 and the like. In a case where the photographing optical system 141 is collapsed, when a cover 160 is slid, the photographing optical system 141, the finder optical system 143 and the flash lamp 146 are covered with the cover 160. When the cover 160 is opened to bring the camera 140 into a photographing state, the photographing optical system 141 is brought into a non-collapsed state shown in FIG. 21. When the shutter release button 145 disposed at an upper portion of the camera 140 is pressed, the photographing is performed through the photographing optical system 141 in response to the pressed button. In an example of FIG. 21, the zoom lens system of Example 1 is used as the photographing optical system 141. An image of an object to be photographed by the photographing optical system 141 is formed on an image pickup surface of a CCD image sensor 149 via a low pass filter F and a cover glass C provided with a wavelength band restrictive coating. The object image received by the CCD image sensor 149 is converted into an electric signal and displayed as an electronic image in the liquid crystal display monitor 147 provided at a back surface of the camera via processing means 151. The processing means 151 is connected to recording means 152, and the photographed electronic image can be recorded. This recording means 152 may be integrated with the processing means 151, or the means may separately be arranged. As the recording means 152, a hard disk drive (HDD), a memory card, a DVD or the like may be used.

An objective optical system 153 for the finder is disposed along the optical path 144 for the finder. The objective optical system 153 for the finder is constituted of a zoom optical system including a plurality of lens units (three lens units in the drawing) and two prisms. In the system, a focal length changes in conjunction with zooming of the photographing optical system 141. The object image is formed by the objective optical system 153 for the finder on a view field frame 157 of an erecting prism 155 which is an image erecting member. Behind the erecting prism 155, an eyepiece optical system 159 is disposed which guides an erected object image into an observer's eyeball E. A cover member 150 is disposed on an emission side of the eyepiece optical system 159.

Figure 22:
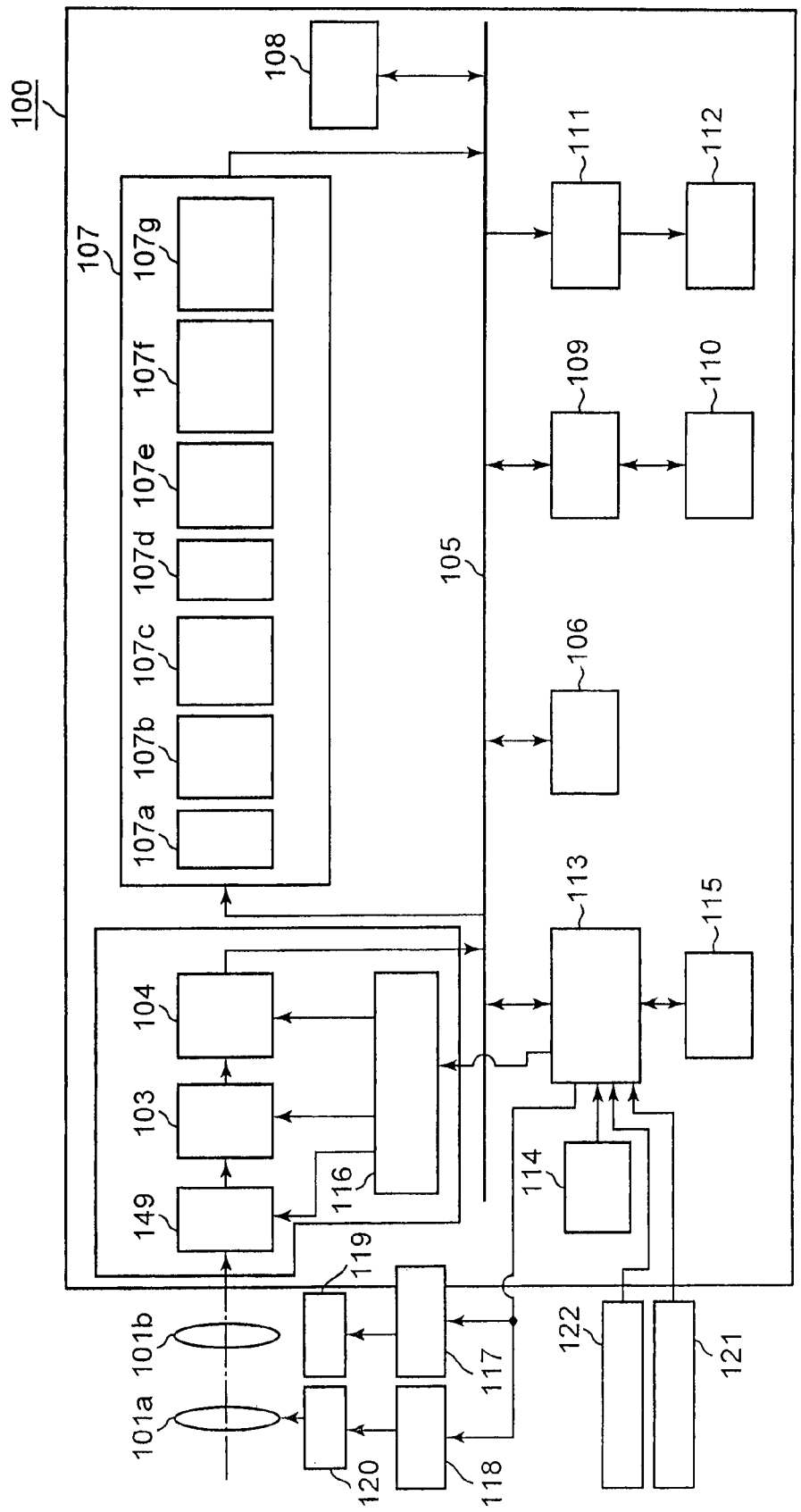
FIG. 22 is a block diagram of the digital camera of FIG. 19.

FIG. 22 is a block diagram of the digital camera shown in FIG. 19. The camera 140 includes the electronic image pickup device 149, a CDS/AGC circuit 103, an A/D converting section 104, a bus 105, an SDRAM 106, an image processing section 107, a JPEG processing section 108, a memory I/F 109, a recording medium 110 as a part of the recording means 152, an LCD driver 111, an LCD 112 for use as a liquid crystal display monitor 147, a microcomputer (CPU) 113, an operating section 114 and a flash memory 115.

The electronic image pickup device 149 is an image pickup device in which a color filter having the Bayer layout is arranged at a front surface of pixels constituted of photodiodes. When an image pickup driving circuit 116 is started based on an instruction of the microcomputer (CPU) 113, the image pickup driving circuit 116 controls the CDS/AGC circuit 103 including a correlated double sampling (CDS) circuit which reduces noise components and an automatic gain control (AGC) circuit which stabilizes a signal level, and the A/D converting section 104 which converts an analog electric signal into a digital electric signal.

The electronic image pickup device 149 receives light of an object image formed via the photographing optical system 141 by the photodiodes constituting the pixels. Here, the photographing optical system 141 includes two parts 101a and 101b, the first part 101a corresponds to the first lens unit G1 to the third lens unit G3 of the zoom lens system, and the second part 101b corresponds to the fourth lens unit G4. In this example, the fourth lens unit G4 performs focusing, and the first lens unit G1 to third lens unit G3 perform a large part of a zoom function. Therefore, the first part 101a is referred to as a zoom part, and the second part 101b is referred to as a focusing part. The received optical image is photoelectrically converted by the electronic image pickup device 149, and a quantity of light is converted into an amount of charges and output to the CDS/AGC circuit 103. Here, the Bayer layout is a pixel layout constituted by alternately arranging, in a vertical direction, a line in which red (R) and green (G) pixels are alternately arranged in a horizontal direction and a line in which the G and blue (B) pixels are alternately arranged in the horizontal direction. It is to be noted that the electronic image pickup device 149 may be either a CMOS type image sensor or a CCD image sensor. Although not shown, the image pickup driving circuit 116 including a timing generator which drives the electronic image pickup device, the CDS/AGC circuit 103 and the A/D converting section 104 include analog front end (AFE) circuit IC devices.

It is assumed that the electronic image pickup device 149 is operable in a plurality of modes including at least a pixel addition readout mode and an all pixel readout mode. The pixel addition readout mode is an operation mode in which charges of a plurality of adjacent pixels are added up and read out. The all pixel readout mode is an operation mode in which all charges are read from effective pixels of the electronic image pickup device.

The CDS/AGC circuit 103 reduces reset noises and the like of the electric signal (the analog image signal) read from the electronic image pickup device 149, shapes a waveform of the signal and increases gains so that brightness of the image reaches target brightness. The A/D converting section 104 converts an analog image signal preprocessed in the CDS/AGC circuit 103 into a digital image signal (hereinafter referred to as the image data).

The bus 105 is a transfer path for transferring various data generated in the camera to sections of the camera, and is connected to the A/D converting section 104, the SDRAM 106, the image processing section 107, the JPEG processing section 108, the memory I/F 109, the LCD driver 111 and the CPU 113. The image data obtained by the A/D converting section 104 is once stored in the SDRAM 106 via the bus 105. The SDRAM 106 is a storage section in which various data such as the image data obtained by the A/D converting section 104 and image data to be processed by the image processing section 107 and the JPEG processing section 108 are temporarily stored.

The image processing section 107 reads the image data stored in the SDRAM 106 to subject the data to image processing. The image processing section 107 includes a white balance (WB) correction circuit 107a, a synchronization circuit 107b, a color conversion/reproduction circuit 107c, a γ-conversion circuit 107d, an edge extraction circuit 107e, a noise reduction processing circuit 107f and an interpolation resize processing circuit 107g.

The WB correction circuit 107a multiplies R and B data of the image data read from the SDRAM 106 by a white balance gain indicated by the CPU 113 to perform white balance correction. The synchronization circuit 107b generates image data including three colors R, G and B as one pixel component from the image data output from the WB correction circuit 107a. The color conversion/reproduction circuit 107c multiplies the image data output from the synchronization circuit 107b by a color matrix indicated by the CPU 113 to perform linear conversion, and corrects color of the image data. The color conversion/reproduction circuit also changes the color of the image by calculation using chroma and hue coefficients indicated by the CPU 113. The γ-conversion circuit 107d subjects the image data output from the color conversion/reproduction circuit 107c to gamma conversion (gray level conversion) processing, and corrects a gray level of the image data so that the level is suitable for display and printing.

The edge extraction circuit 107e extracts a contour (edge) component of the image data by use of a band pass filter (BPF) coefficient indicated by the CPU 113. The noise reduction processing circuit 107f filters the image data by use of a filter parameter indicated by the CPU 113 to reduce noises of the image data. The interpolation resize processing circuit 107g subjects the image data to interpolation processing and resize processing for regulating an output size.

The image data subjected to the image processing by the above-mentioned image processing section 107 is stored again in the SDRAM 106.

The JPEG processing section 108 reads the image data subjected to the image processing from the SDRAM 106 to perform compression in accordance with the JPEG standard. The JPEG processing section 108 also has a function of reading JPEG compression image data recorded in the recording medium 110 to subject the data to decompression processing. The image data compressed by the JPEG processing section 108 is stored in the SDRAM 106, and then recorded in the recording medium 110 via the memory I/F 109. For example, a memory card detachably attached to a camera main body may be used as the recording medium 110 as described above, but the present invention is not limited to this medium.

The LCD driver 111 displays the image in the LCD 112. To display the JPEG compression image data recorded in the recording medium 110, the JPEG processing section 108 reads the JPEG compression image data recorded in the recording medium 110 to subject the data to the decompression processing, and the data is then stored once in the SDRAM 106. The LCD driver 111 reads the image data from the SDRAM 106 to convert the data into a video signal, and the image is then displayed in the LCD 112.

The CPU 113 generally controls various sequences of the camera main body. The CPU 113 is connected to the operating section 114 and the flash memory 115 in which a camera program and focus lens position data are stored. The operating section 114 is an operation member such as a power supply button, a release button and various input keys. When a user operates the operating section 114, the CPU 113 executes various sequences in response to an operation of the operating section 114. The flash memory 115 is a storage section in which various parameters such as the white balance gain, the color matrix and the filter parameter are stored. The CPU 113 reads the parameters required for various sequences from the flash memory 115, and gives an instruction to each processing section. A sensor 122 for reference is a sensor which detects whether or not the focus lens 110b is disposed at a reference position. A temperature sensor 121 detects temperature, and notifies the CPU 113 of a result of the detection.

The operating section 114 includes various buttons, switches and the like which accept various instructions from a photographer to notify the CPU 113 of the instructions, and corresponds to the release button 145, the focal length change button 161, the setting change switch 162 and the like which instruct start of the photographing and the like as shown in FIG. 19. It is to be noted that, in accordance with characteristics of the camera, the camera may be provided with various operation buttons and switches such as a focus mode changeover button for instructing changeover of an auto focus (AF) mode/a manual focus (MF) mode, an MF driving button for instructing movement of the focusing part 101b during selection of the MF mode, a preset button for instructing storage of the data of a position of the focusing part 101b, a preset value readout button for instructing readout of the data of the position of the focusing part 101b and an infinity button for instructing movement of the focusing part 101b to a position for focusing at infinity in accordance with a zoom state.

The CPU 113 executes the camera program stored beforehand in the flash memory 115 to control an operation of the whole electronic camera. For example, the CPU performs AF processing (contrast AF processing) and the like based on contrast of a subject image.

On receiving the instruction of the CPU 113 via a zoom control section 118 including a driving circuit, a motor 120 for zooming drives the zoom part 101a. On receiving the instruction of the CPU 113 via a focus control section 117 including a driving circuit, a motor 119 for focusing drives the focusing part 101b. It is to be noted that the focusing part 101b is driven by the motor 119 for focusing in both of the AF mode and the MF mode.

Here, one example of a camera program stored in the flash memory 115 will be described.

Figures 24A, 24B:
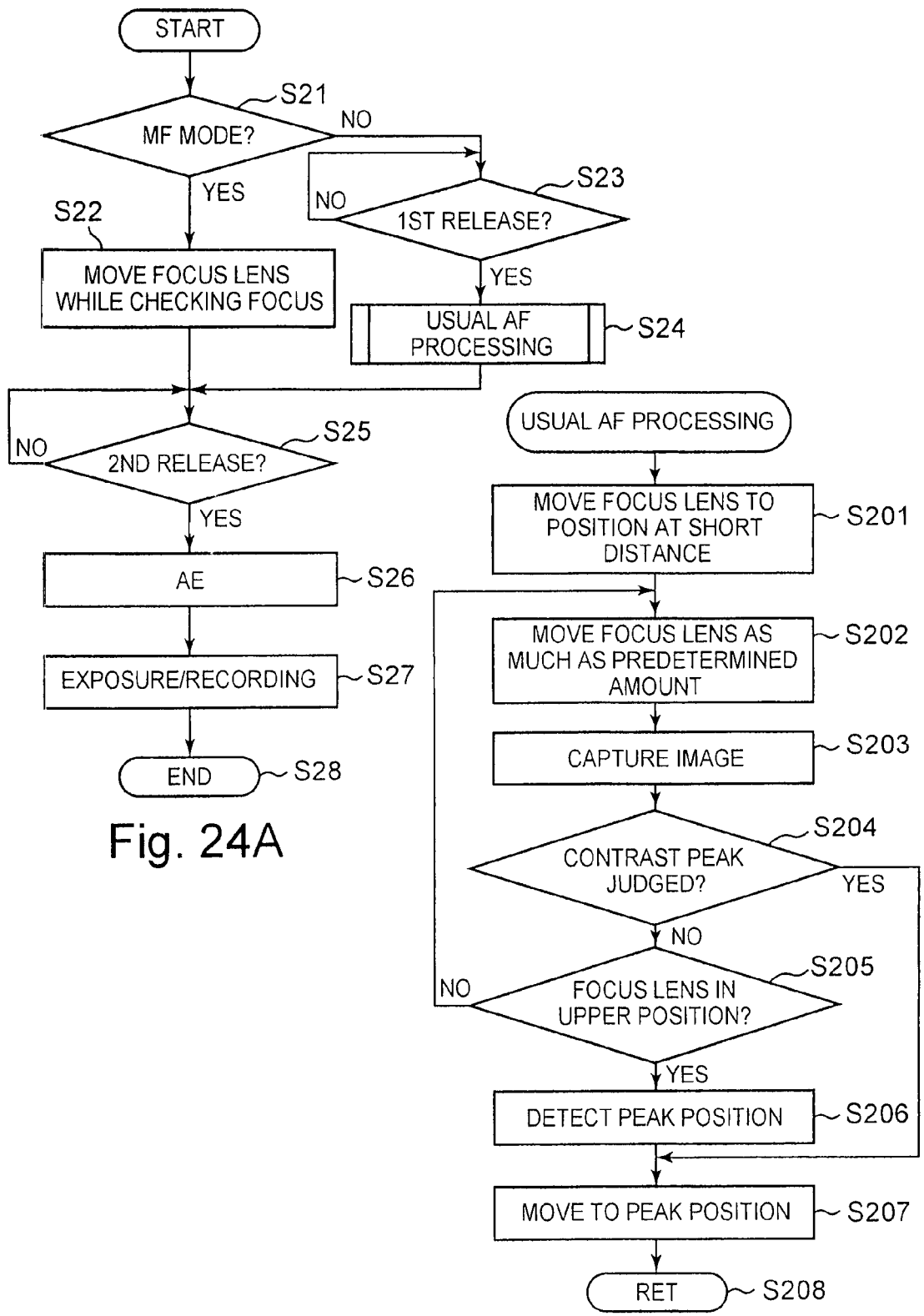
FIGS. 24A and 24B are flow charts showing an outline of a focusing operation of this digital camera.

FIGS. 24A and 24B show one example of a flow chart of processing to be executed at a time when the focus lens of the focusing section is preset at a position (a position corresponding to infinity) focused on an infinite object. In FIG. 24A, first in step S21, it is judged whether or not a selected focus mode is the MF mode. When the judgment result is affirmative, the processing advances to step S22. When the result is negative, the processing advances to step S23. It is to be noted that, the focus mode switching button is operated (depressed) by a photographer as described above to select either the MF mode or the AF mode.

In the step S23, the release button is operated, and it is judged whether or not the release button is depressed to a first release position. When the judgment result is affirmative, the processing advances to step S24. When the result is negative, the present step is repeated. In the step S24, usual AF processing is performed by a contrast detection AF system shown in FIG. 24B.

In step S25, it is judged whether or not the release button is depressed to a second release position and a photographing start instruction has been given. When the judgment result is affirmative, the processing advances to step S26. When the result is negative, the present step is repeated. In the step S26, AE processing is performed, and exposure conditions (a shutter speed, an aperture value, etc.) are determined. In step S27, exposure is performed based on the exposure conditions determined in the previous step. That is, an object image formed based on the exposure conditions is photoelectrically converted by a CCD, and the above-mentioned processing is performed by the image pickup processing section to obtain image data which is a digital electric signal. Moreover, the image data is subjected to predetermined image processing such as compression processing, and recorded in a memory card to end the present flow.

It is to be noted that in FIG. 24B, first in step S201, the focus lens is moved to a lower limit position (a position at which an object at a shortest distance is focused). In step S202, the focus lens is moved toward an upper limit position (a position at which an infinite object is focused) as much as a predetermined unit amount. The upper limit position may be referred as a limited position on infinity side. In step S203, an image of a predetermined area of the object image formed on the image pickup device is captured, and a contrast value of the image of the predetermined area is obtained. It is judged in step S204 whether or not a predetermined contrast peak exists during a movement of the lens moves from the lower limit position up to a current position. When the judgment result is affirmative, the processing advances to step S207. When the result is negative, the processing advances to step S205. In a case where it is judged that the contrast peak apparently exists in a region of the lower limit position to an upper limit position described later, it is assumed that a focus lens position where the contrast peak is obtained is an in-focus position, and a time for detecting the in-focus position is reduced. It is judged in the step S205 whether or not the focus lens position is the upper limit position. When the judgment result is affirmative, the processing advances to step S206. When the result is negative, the processing returns to the step S202. When the apparent contrast peak cannot be found in the above-mentioned processing of the step S204, in the step S206, a focus lens position having the largest contrast value, that is, the focus lens position having the contrast peak value is obtained from the contrast value obtained in the above-mentioned processing of the step S203 at a position corresponding to each predetermined unit amount between the lower limit position and the upper limit position. In the step S207, the focus lens is moved to the focus lens position having the contrast peak value obtained in the previous step. Then, the flow of FIG. 24B returns to FIG. 24A and it is judged in the step S25 whether or not the release button is depressed to the second release position. When the judgment result is affirmative, the processing advances to the step S26. When the result is negative, the present step is repeated.

Figures 23A, 23B:
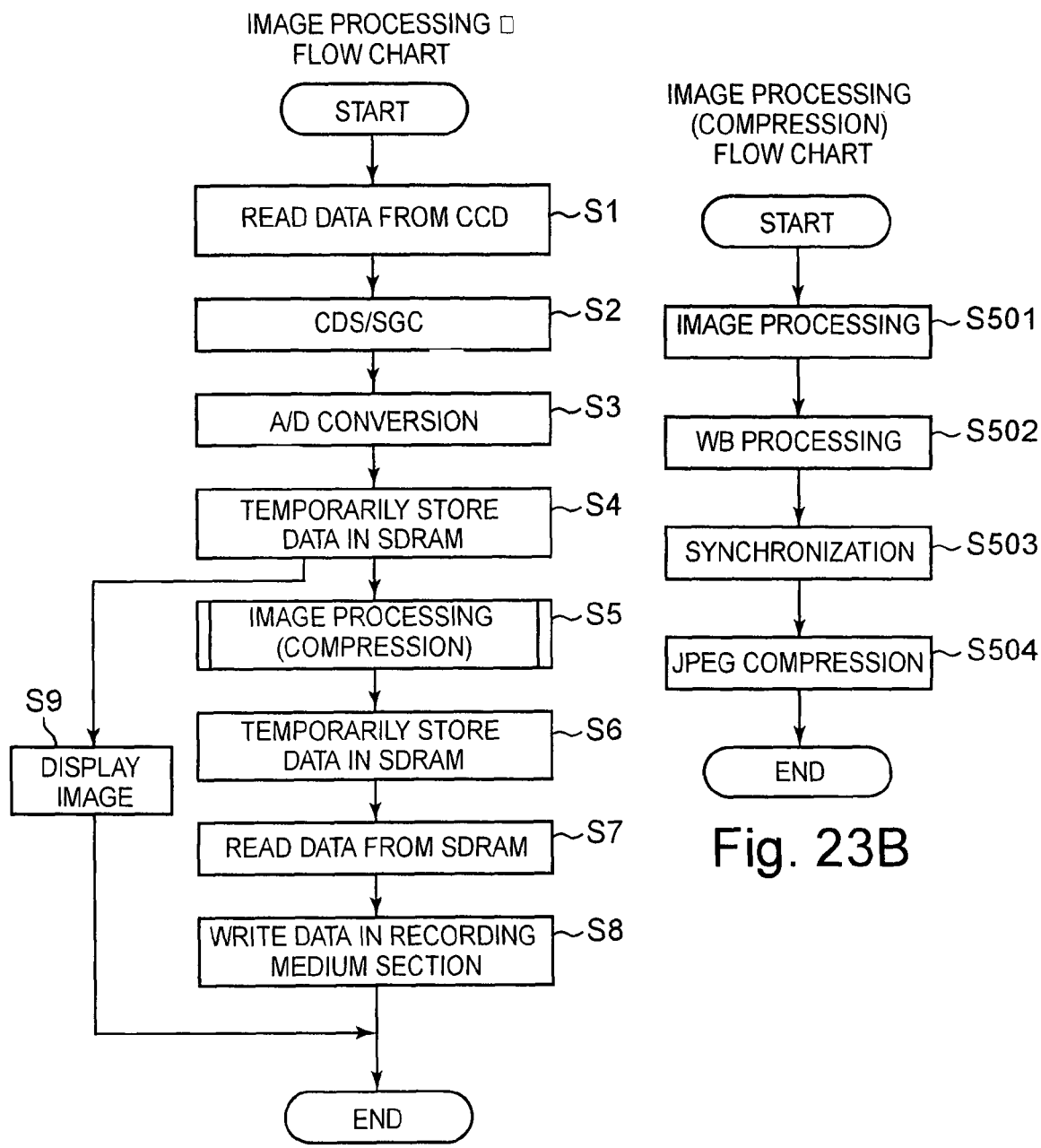
FIGS. 23A and 23B are flow charts schematically showing operations of displaying and storing an image in the digital camera of FIG. 19.

FIGS. 23A and 23B are flow charts schematically showing operations of displaying and storing the image. These operations are all controlled by the CPU 113 in accordance with the operation program stored in the flash memory 115.

These operations will be described with reference to FIGS. 23A and 23B.

First, the object image formed via the zoom part 101a and the focusing part 101b constituting the photographing optical system is received by the pixels (photodiodes) constituting the electronic image pickup device (step S1).

Subsequently, the CDS/AGC circuit 103 performs processing of reducing reset noises and the like of the electric signal (the analog image signal) read from the electronic image pickup device 149, then shaping the waveform of the signal and further increasing gains so that the brightness of the image reaches the target brightness (step S2). Subsequently, the CDS/AGC circuit 103 A/D converts the preprocessed analog image signal into the digital image signal (the image data) (step S3). The image data obtained in the A/D conversion step S3 is once stored in the SDRAM 106 via the bus 105 (step S4).

After reading the image data from the SDRAM 106 to convert the data into the video signal, the LCD driver 111 displays the image in the LCD 112 (step S9).

On the other hand, the image data read from the SDRAM 106 is subjected to the image processing (compression) (step S5) before stored. In this image processing (compression) step S5, as shown in FIG. 23B, image processing (step S501) is performed, then WB correction processing (step S502) is performed in which the R and B data of the image data read from the SDRAM 106 are multiplied by the white balance gain indicated by the CPU 113 to thereby correct the white balance, and synchronization processing (step S503) is performed to generate the image data including three colors R, G and B as one pixel component. Various data such as the image data processed in this manner are temporarily stored in the SDRAM 106. The image data and the like are read from the SDRAM 106, further subjected to JPEG compression processing (step S504) and stored in the SDRAM 106 again (step S6). This compressed image data and the like are read from the SDRAM 106 (step S7), and written in the recording medium 110 via the memory I/F 109 (step S8).

In the digital camera 140 constituted in this manner, the zoom lens system of the present invention is used as the photographing optical system 141. Therefore, the camera has a remarkably small thickness at a time when the lens barrel is collapsed, has a high zoom ratio and has a stable image forming performance in the whole magnification change region. In consequence, the high performance, miniaturization and wide angle of the camera are realized.

The invention being thus described, it will be obvious that the same may be varied in many ways. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A zoom lens system comprising, in order from an object side:
   a first lens unit having a positive refractive power;
   a second lens unit having a negative refractive power;
   an aperture stop;
   a third lens unit having a positive refractive power; and
   a fourth lens unit having a positive refractive power,
   during magnification change, the first lens unit, the second lens unit, the third lens unit, the fourth lens unit and the aperture stop being configured to move along an optical axis of the zoom lens system,
   the first lens unit including two lenses of a negative lens and a positive lens in order from the object side,
   the second lens unit including two lenses of a negative lens and a positive lens in order from the object side,
   the third lens unit including three or less lenses including one positive lens and one negative lens,
   the fourth lens unit including one positive lens,
   a total number of lens elements included in the first lens unit is two,
   a total number of lens elements included in the second lens unit is two,
   a total number of lens elements included in the third lens unit is three or less, and
   a total number of lens elements included in the fourth lens unit is one,
   wherein the negative lens and the positive lens of the first lens unit are consisting of single lenses, respectively, and are not cemented to each other,
   an air lens is formed between the negative lens and the positive lens of the first lens unit, and
   the following condition is satisfied:

$$-105.0 < SF_{1air} < 0 \quad (9),$$

in which $SF_{1air}$ is defined as $SF_{1air}=(R_{1nr}+R_{1pf})/(R_{1nr}-R_{1pf})$, $R_{1nr}$ is a radius of curvature of an image-side surface of the negative lens of the first lens unit, and $R_{1pf}$ is a radius of curvature of an object-side surface of the positive lens of the first lens unit.

2. The zoom lens system according to claim 1, wherein the following condition is satisfied:

$$0.50 < f_1/f_t < 2.00 \quad (1),$$

in which $f_1$ is a focal length of the first lens unit, and $f_t$ is a focal length of the zoom lens system in a telephoto end.

3. The zoom lens system according to claim 1 or 2, wherein the negative lens of the second lens unit is a double concave lens, and
the following condition is satisfied:

$$0.35 < SF_{2n} < 1.00 \quad (2),$$

in which $SF_{2n}$ is defined as $SF_{2n}=(R_{2nf}+R_{2nr})/(R_{2nf}-R_{2nr})$, $R_{2nf}$ is a radius of curvature of an object-side surface of the negative lens of the second lens unit, and $R_{2nr}$ is a radius of curvature of an image-side surface of the negative lens of the second lens unit.

4. The zoom lens system according to claim 1 or 2, wherein at least one lens surface of the negative lens of the second lens unit is an aspherical surface, and
the following condition is satisfied:

$$0.030 < (|ASP_{2nf}|+|ASP_{2nr}|)/f_w < 0.110 \quad (3),$$

in which $ASP_{2nf}$ is a an aspherical displacement of an object-side surface of the negative lens of the second lens unit, $ASP_{2nr}$ is an aspherical displacement of an image-side surface of the negative lens of the second lens unit, and $f_w$ is a focal length of the zoom lens system in a wide-angle end.

5. The zoom lens system according to claim 1 or 2, wherein the negative lens and the positive lens of the second lens unit satisfy the following conditions:

$$1.76 < n_{d2n} < 2.00 \quad (4);$$

$$1.84 < n_{d2p} < 2.20 \quad (5);$$

$$35.0 < Vd_{2n} < 50.0 \quad (6); \text{ and}$$

$$13.0 < Vd_{2p} < 30.0 \quad (7),$$

in which $n_{d2n}$ is a refractive index of the negative lens of the second lens unit for the d-line, $n_{d2p}$ is a refractive index of the positive lens of the second lens unit for the d-line, $Vd_{2n}$ is the Abbe number of the negative lens of the second lens unit for the d-line, and $Vd_{2p}$ is the Abbe number of the positive lens of the second lens unit for the d-line.

6. The zoom lens system according to claim 1 or 2, wherein the positive lens of the first lens unit satisfies the following condition:

$$-1.80 < SF_{1p} < -0.55 \quad (8),$$

in which $SF_{1p}$ is defined as $SF_{1p}=(R_{1pf}+R_{1pr})/(R_{1pf}-R_{1pr})$, $R_{1pf}$ is a radius of curvature of an object-side surface of the positive lens of the first lens unit, and $R_{1pr}$ is a radius of curvature of an image-side surface of the positive lens of the first lens unit.

7. The zoom lens system according to claim 1 or 2, wherein the third lens unit consists of two lenses of a positive lens and a negative lens in order from the object side.

8. The zoom lens system according to claim 7, wherein the positive lens of the third lens unit closest to the object side satisfies the following condition:

$$-1.00 < SF_{3p} < -0.05 \quad (10),$$

in which $SF_{3p}$ is defined as $SF_{3p}=(R_{3pf}+R_{3pr})/(R_{3pf}-R_{3pr})$, $R_{3pf}$ is a radius of curvature of an object-side surface of the positive lens of the third lens unit closest to the object

37 side, and $R_{3pr}$ is a radius of curvature of an image-side surface of the positive lens of the third lens unit closest to the object side.

9. The zoom lens system according to claim 1 or 2, wherein the third lens unit consists of three lenses of a positive lens, a positive lens and a negative lens in order from the object side.

10. The zoom lens system according to claim 9, wherein the positive lens of the third lens unit closest to the object side satisfies the following condition:

$$-1.00 < SF_{3p} < -0.05 \qquad (10),$$

in which $SF_{3p}$ is defined as $SF_{3p}=(R_{3pf}+R_{3pr})/(R_{3pf}-R_{3pr})$, $R_{3pf}$ is a radius of curvature of an object-side surface of the positive lens of the third lens unit closest to the object side, and $R_{3pr}$ is a radius of curvature of an image-side surface of the positive lens of the third lens unit closest to the object side.

11. The zoom lens system according to claim 1 or 2, wherein the following condition is satisfied:

$$-0.50 < f_2/f_t < -0.10 \qquad (11),$$

in which $f_2$ is a focal length of the second lens unit, and $f_t$ is a focal length of the zoom lens system in a telephoto end.

12. The zoom lens system according to claim 1 or 2, wherein the following condition is satisfied:

$$0.20 < f_3/f_t < 0.45 \qquad (12),$$

in which $f_3$ is a focal length of the third lens unit, and $f_t$ is a focal length of the zoom lens system in a telephoto end.

13. The zoom lens system according to claim 12, wherein the fourth lens unit is formed of a plastic material.

14. The zoom lens system according to claim 1 or 2, wherein the following condition is satisfied:

$$0.35 < f_4/f_t < 0.90 \qquad (13),$$

in which $f_4$ is a focal length of the fourth lens unit, and $f_t$ is a focal length of the zoom lens system in a telephoto end.

15. The zoom lens system according to claim 1 or 2, wherein the fourth lens unit is provided with an aspherical surface, and satisfies the following condition:

$$0 < |ASP_{4p}/f_4| < 0.02 \qquad (14),$$

in which $ASP_{4p}$ is an aspherical displacement of the aspherical surface disposed at the fourth lens unit, and $f_4$ is a focal length of the fourth lens unit.

16. The zoom lens system according to claim 1 or 2, wherein all lens surfaces of the first lens unit are spherical surfaces.

17. The zoom lens system according to claim 1 or 2, wherein the following condition is satisfied:

$$4.0 < f_t/f_w < 10.0 \qquad (15),$$

in which $f_w$, is a focal length of the zoom lens system in a wide-angle end, and $f_t$ is a focal length of the zoom lens system in a telephoto end.

18. An electronic image pickup apparatus comprising:
the zoom lens system according to claim 1 or 2; and
an electronic image pickup device which is arranged on an image side of the zoom lens system and which converts an image formed by the zoom lens system into an electric signal.

19. A method of recording a photographed image, comprising:
receiving an image formed by the zoom lens system according to claim 1 with an electronic image pickup device;
retaining an image signal output from the electronic image pickup device, controlling a gain of the image signal and then A/D converting the image signal;
storing the A/D converted image signal in a memory;
subjecting the image signal read from the memory to image compression processing; and
then recording the image signal in a recording medium.

20. A method of recording a photographed image, comprising:
receiving an image formed by the zoom lens system according to claim 1 with an electronic image pickup device;
retaining an image signal output from the electronic image pickup device, controlling a gain of the image signal and then A/D converting the image signal;
storing the A/D converted image signal in a memory; and
reading the image signal from the memory and displaying the image in a display section.

21. A method of photographing by an electronic image pickup apparatus device provided with an automatic focusing step of automatically performing focusing based on a contrast of an object image and a manual focusing step of manually performing the focusing, the method comprising:
selecting one of the automatic focusing step and the manual focusing step;
judging whether or not a photographing start instruction is given by a release button, and determining exposure conditions after the photographing start instruction is given; and
receiving an object image formed by the zoom lens system according to claim 1 by an image pickup device based on the exposure conditions.

* * * * *